(12) United States Patent
Ota

(10) Patent No.: US 12,088,928 B2
(45) Date of Patent: Sep. 10, 2024

(54) DISPLAY CONTROL DEVICE AND DISPLAY CONTROL METHOD

(71) Applicant: CANON KABUSHIKI KAISHA, Tokyo (JP)

(72) Inventor: Tomohiro Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 18/064,688

(22) Filed: Dec. 12, 2022

(65) Prior Publication Data

US 2023/0188864 A1 Jun. 15, 2023

(30) Foreign Application Priority Data

Dec. 15, 2021 (JP) .................................. 2021-203246

(51) Int. Cl.
*H04N 23/80* (2023.01)
*G02B 7/02* (2021.01)
*H04N 23/62* (2023.01)
*H04N 23/63* (2023.01)

(52) U.S. Cl.
CPC ............... *H04N 23/80* (2023.01); *G02B 7/02* (2013.01); *H04N 23/62* (2023.01); *H04N 23/633* (2023.01)

(58) Field of Classification Search
None
See application file for complete search history.

(56) References Cited

U.S. PATENT DOCUMENTS

| | | | |
|---|---|---|---|
| 11,755,089 B2 * | 9/2023 | Hayashi | H02H 3/202 713/340 |
| 2008/0215265 A1 * | 9/2008 | Tohyama | G01R 31/3648 702/63 |
| 2011/0221395 A1 * | 9/2011 | Tohyama | G01R 31/3648 320/136 |
| 2020/0371573 A1 * | 11/2020 | Nagano | G09G 3/36 |

FOREIGN PATENT DOCUMENTS

| | | | | |
|---|---|---|---|---|
| JP | 2008118530 A | | 5/2008 | |
| JP | 5310906 B2 * | | 10/2013 | G03B 15/05 |

OTHER PUBLICATIONS

JP-5310906-B2; Nikon Corp; Accessories and Cameras; Oct. 9, 2013; English Translation (Year: 2013).*

* cited by examiner

*Primary Examiner* — Cynthia Segura
(74) *Attorney, Agent, or Firm* — Canon U.S.A., Inc. IP Division

(57) ABSTRACT

A display control device is related to an electronic device, the display control device including: an acquiring unit configured to acquire conditions of a first factor that is at least one factor out of a plurality of factors, the conditions corresponding to a selection performed by a user; a determining unit configured to determine conditions of a second factor out of the plurality of factors that is different from the first factor on a basis of conditions of the first factor acquired by the acquiring unit, the conditions being conditions under which maximum electric power consumption is not more than suppliable electric power without operation of the electronic device being limited in a predetermined situation; and a control unit configured to control a display unit to display conditions of the second factor determined by the determining unit.

19 Claims, 15 Drawing Sheets

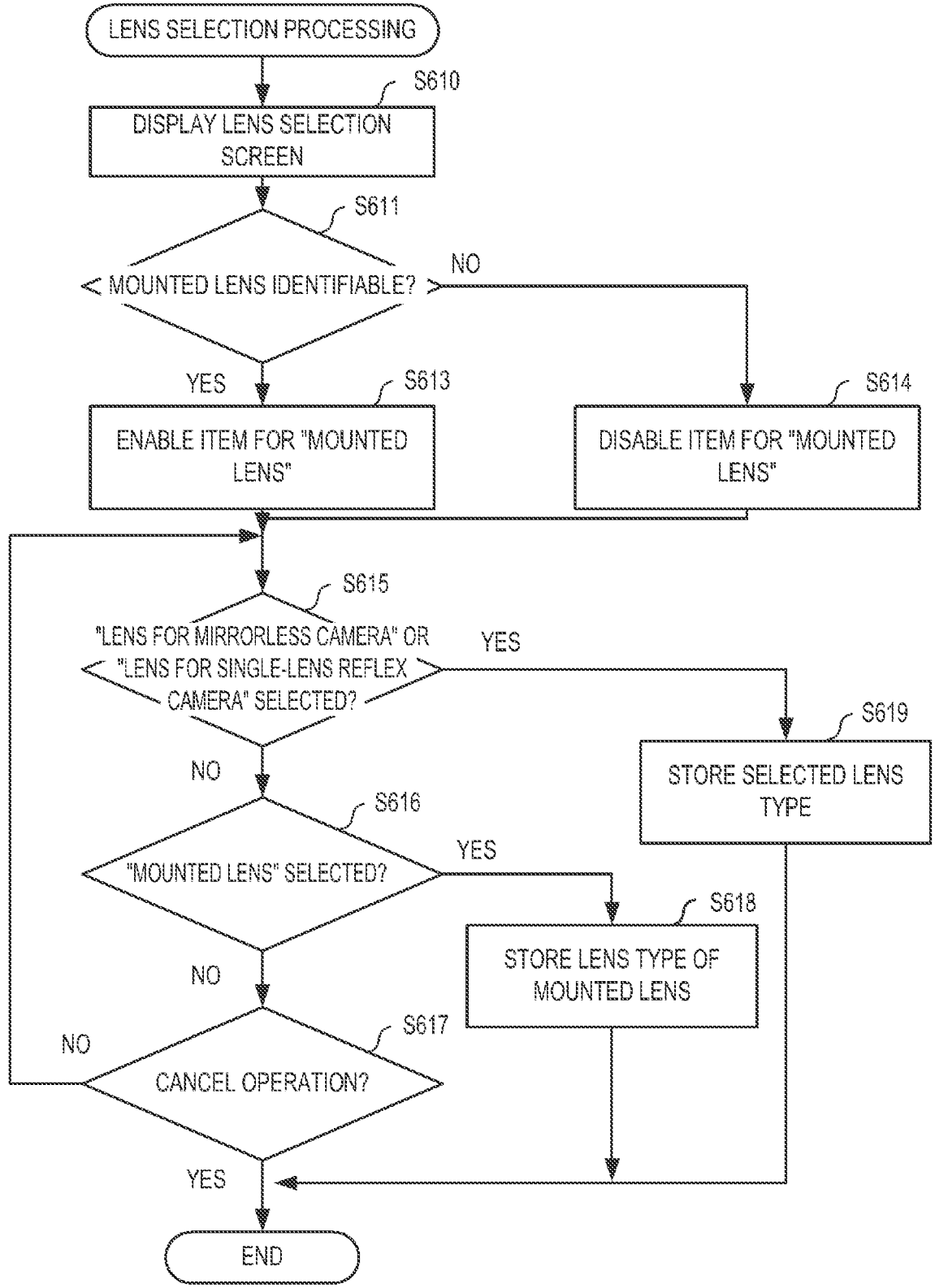

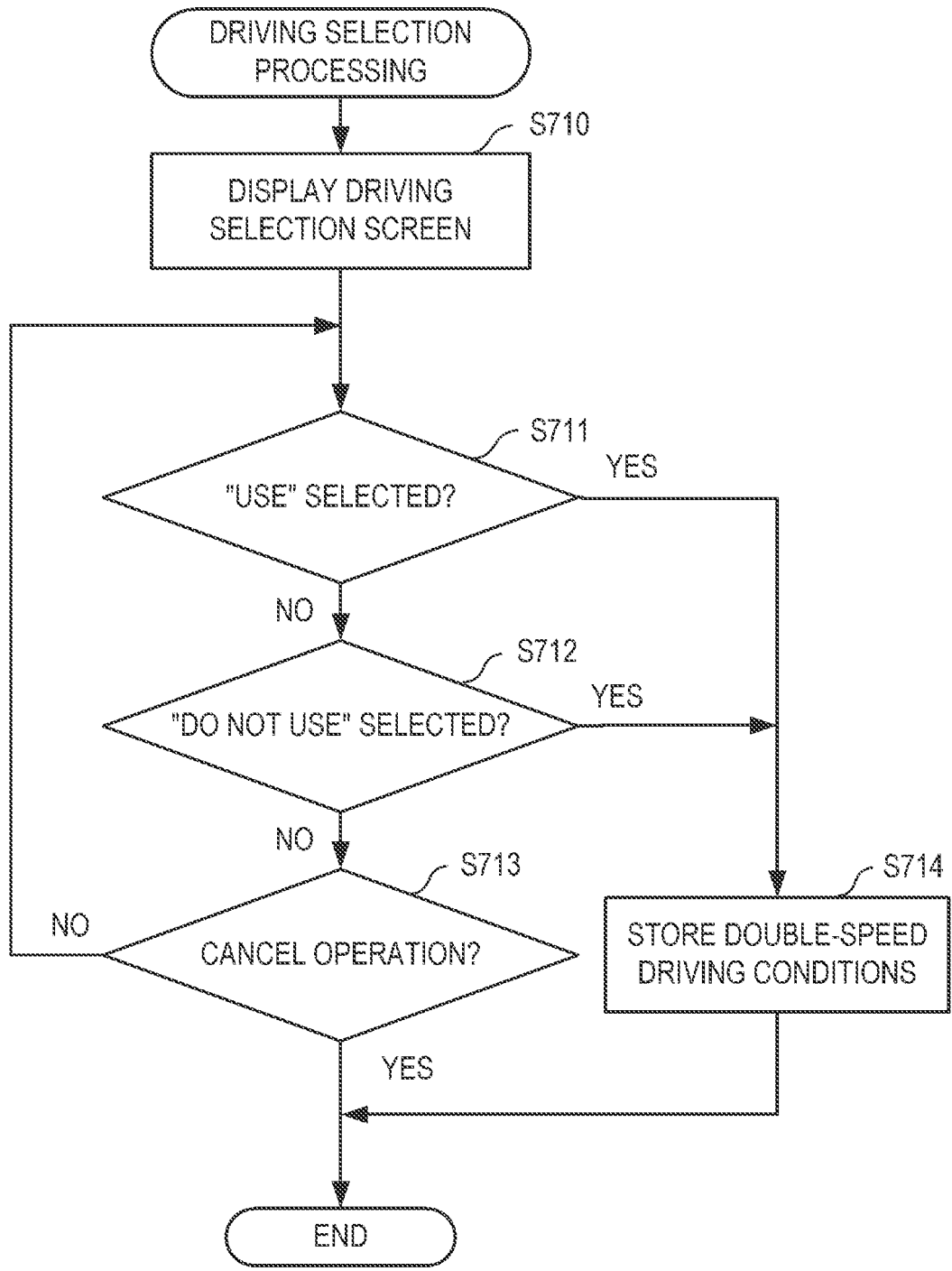

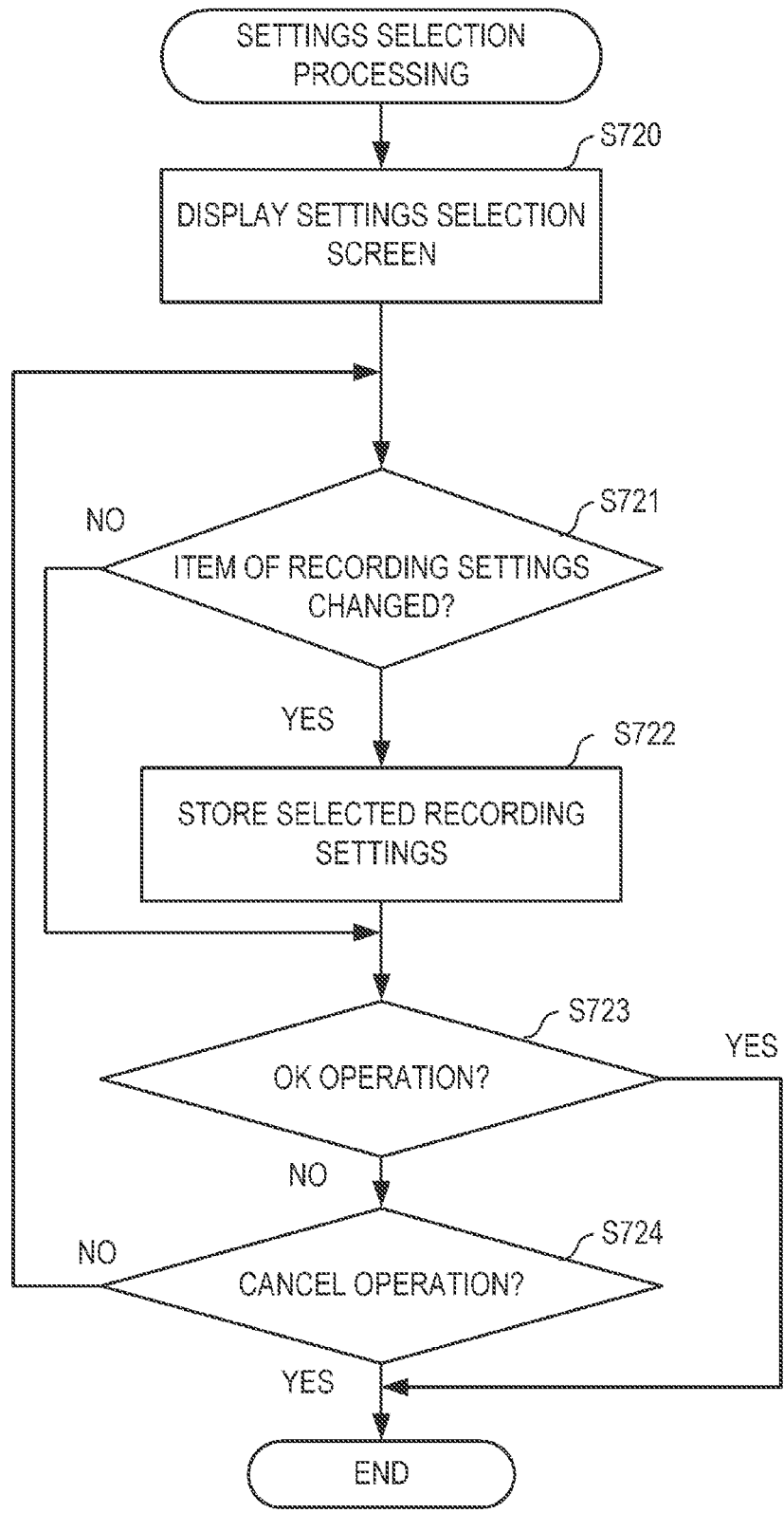

FIG. 8

| NO. | LENS TYPE | RECORDING SETTINGS ||| DOUBLE-SPEED DRIVING | MICROPHONE ELECTRIC POWER FEEDING PERFORMED ||| MICROPHONE ELECTRIC POWER FEEDING NOT PERFORMED |||
|---|---|---|---|---|---|---|---|---|---|---|---|
| | | SENSOR MODE | RECORDING FORMAT | FRAME RATE | | BATTERY PACK | ELECTRIC POWER SOURCE | AC ADAPTER | BATTERY PACK | ELECTRIC POWER SOURCE | AC ADAPTER |
| 1 | FOR MIRRORLESS | FULL-SIZE | RAW | 31 to 60 | ON | × | ○ | ○ | ○ | ○ | ○ |
| 2 | FOR MIRRORLESS | FULL-SIZE | RAW | 31 to 60 | OFF | × | ○ | ○ | ○ | ○ | ○ |
| 3 | FOR MIRRORLESS | FULL-SIZE | RAW | 1 to 30 | ON | × | ○ | ○ | ○ | ○ | ○ |
| 4 | FOR MIRRORLESS | FULL-SIZE | RAW | 1 to 30 | OFF | ○ | ○ | ○ | ○ | ○ | ○ |
| 5 | FOR MIRRORLESS | Super35mm | RAW | 31 to 60 | ON | ○ | ○ | ○ | ○ | ○ | ○ |
| 6 | FOR MIRRORLESS | Super35mm | RAW | 31 to 60 | OFF | ○ | ○ | ○ | ○ | ○ | ○ |
| 7 | FOR MIRRORLESS | Super35mm | RAW | 1 to 30 | ON | × | × | ○ | × | ○ | ○ |
| 8 | FOR MIRRORLESS | Super35mm | RAW | 1 to 30 | OFF | × | × | ○ | × | ○ | ○ |
| 9 | FOR SINGLE-LENS | FULL-SIZE | RAW | 31 to 60 | ON | × | × | ○ | × | ○ | ○ |
| 10 | FOR SINGLE-LENS | FULL-SIZE | RAW | 31 to 60 | OFF | ○ | ○ | ○ | ○ | ○ | ○ |
| 11 | FOR SINGLE-LENS | FULL-SIZE | RAW | 1 to 30 | ON | × | ○ | ○ | ○ | ○ | ○ |
| 12 | FOR SINGLE-LENS | FULL-SIZE | RAW | 1 to 30 | OFF | ○ | ○ | ○ | ○ | ○ | ○ |
| 13 | FOR MIRRORLESS | Super35mm | RAW | 31 to 60 | ON | × | ○ | ○ | ○ | ○ | ○ |
| 14 | FOR MIRRORLESS | Super35mm | RAW | 31 to 60 | OFF | × | ○ | ○ | ○ | ○ | ○ |
| 15 | FOR MIRRORLESS | Super35mm | RAW | 1 to 30 | ON | × | ○ | ○ | ○ | ○ | ○ |
| 16 | FOR MIRRORLESS | Super35mm | RAW | 1 to 30 | OFF | ○ | ○ | ○ | ○ | ○ | ○ |
| ⋮ | ⋮ | ⋮ | ⋮ | ⋮ | ⋮ | ⋮ | ⋮ | ⋮ | ⋮ | ⋮ | ⋮ |

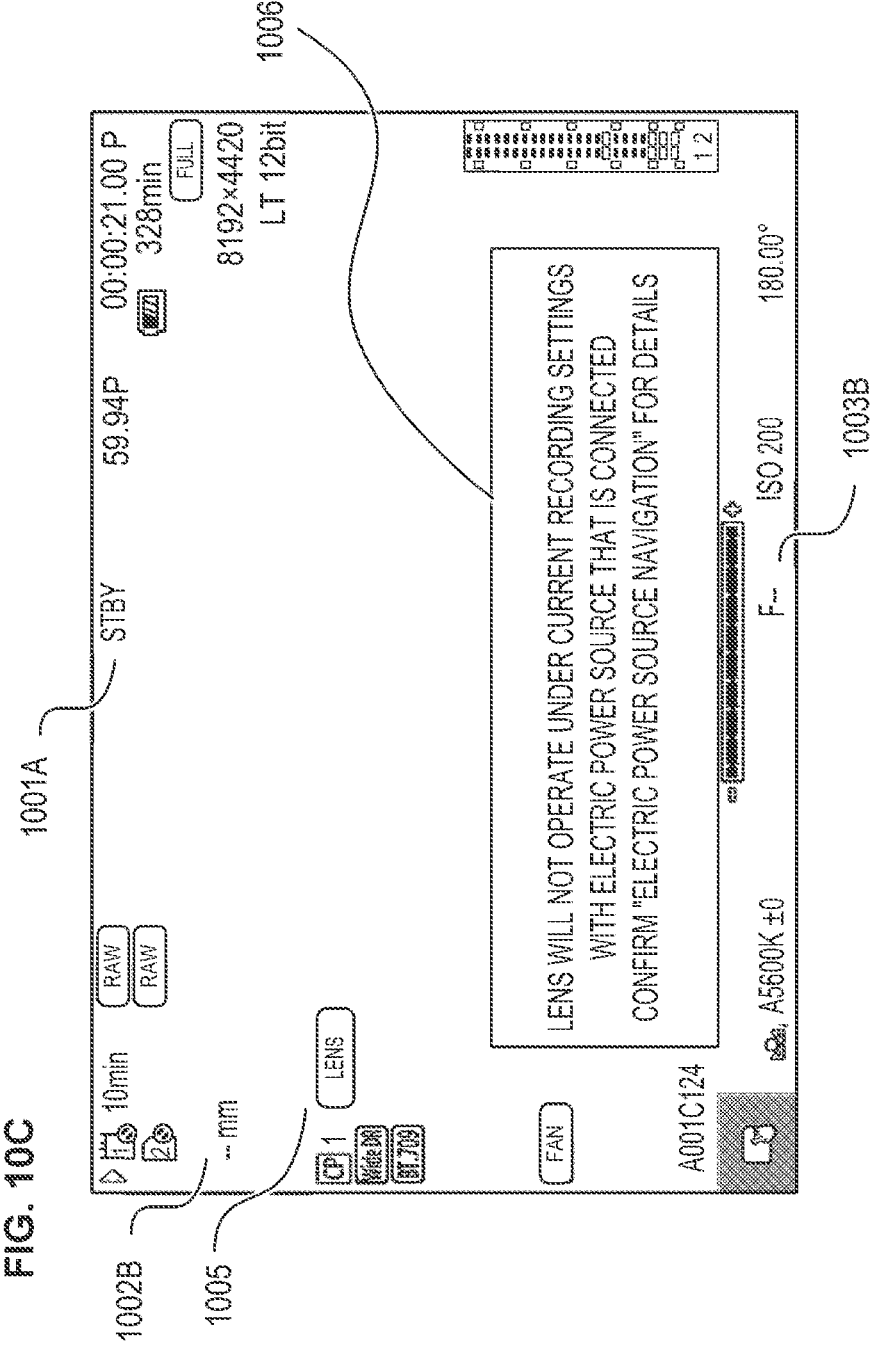

DISPLAY CONTROL DEVICE AND DISPLAY CONTROL METHOD

BACKGROUND

Field of the Disclosure

The present disclosure relates to a display control device and a display control method.

Description of the Related Art

When an electric power source to supply electric power to an electronic device can be selected from a plurality of electric power sources, there are cases in which electric power that the electric power sources can supply (electric power supply capabilities) differs depending on the type of the electric power source. Also, the electric power that the electronic device requires changes in accordance with mounted accessories and operation settings, and accordingly, operations of the electronic device may be limited depending on the combination of the type of the electric power source and the operation settings.

Japanese Patent Application Publication No. 2008-118530 discloses a camera in which, in order to display a state of settings of the camera in an easily-understandable manner, when one shooting mode is selected out of a plurality of shooting modes, an information display is displayed in a different form in accordance with the selection.

However, in Japanese Patent Application Publication No. 2008-118530, the user can only be made to readily understand the current settings of the camera (electronic device), and cannot comprehend conditions where operations of a digital camera are not limited (conditions occurring in accordance with the type of the electric power source and operation settings). Accordingly, there is a possibility that operations of the digital camera will be limited in situations unintended by the user, and there were cases where usability was reduced.

SUMMARY

Accordingly, it is an object of some embodiments to cause the user to comprehend usage conditions of the electronic device, so that usability is not reduced.

An aspect of the present disclosure is a display control device related to an electronic device, wherein suppliable electric power of the electronic device is electric power suppliable from an electric power source to the electronic device, the suppliable electric power being determined on a basis of a type of electric power source, maximum electric power consumption of the electronic device is determined on a basis of at least a plurality of factors including the type of electric power source, and the display control device includes at least one memory and at least one processor which function as: an acquiring unit configured to acquire conditions of a first factor that is at least one factor out of the plurality of factors, the conditions corresponding to a selection performed by a user; a determining unit configured to determine conditions of a second factor out of the plurality of factors that is different from the first factor on a basis of conditions of the first factor acquired by the acquiring unit, the conditions being conditions under which the maximum electric power consumption is not more than the suppliable electric power without operation of the electronic device being limited in a predetermined situation; and a control unit configured to control a display unit to display conditions of the second factor determined by the determining unit.

Further features of various embodiments will become apparent from the following description of exemplary embodiments with reference to the attached drawings.

BRIEF DESCRIPTION OF THE DRAWINGS

FIG. 6A is a flowchart showing lens selection processing.

FIG. 7A is a flowchart showing driving selection processing, and FIG. 7B is a flowchart showing settings selection processing.

FIG. 8 is a diagram showing a determination table.

FIGS. 10A to 10C are diagrams illustrating screens on the display unit.

DESCRIPTION OF THE EMBODIMENTS

Embodiment 1

Figure 1:
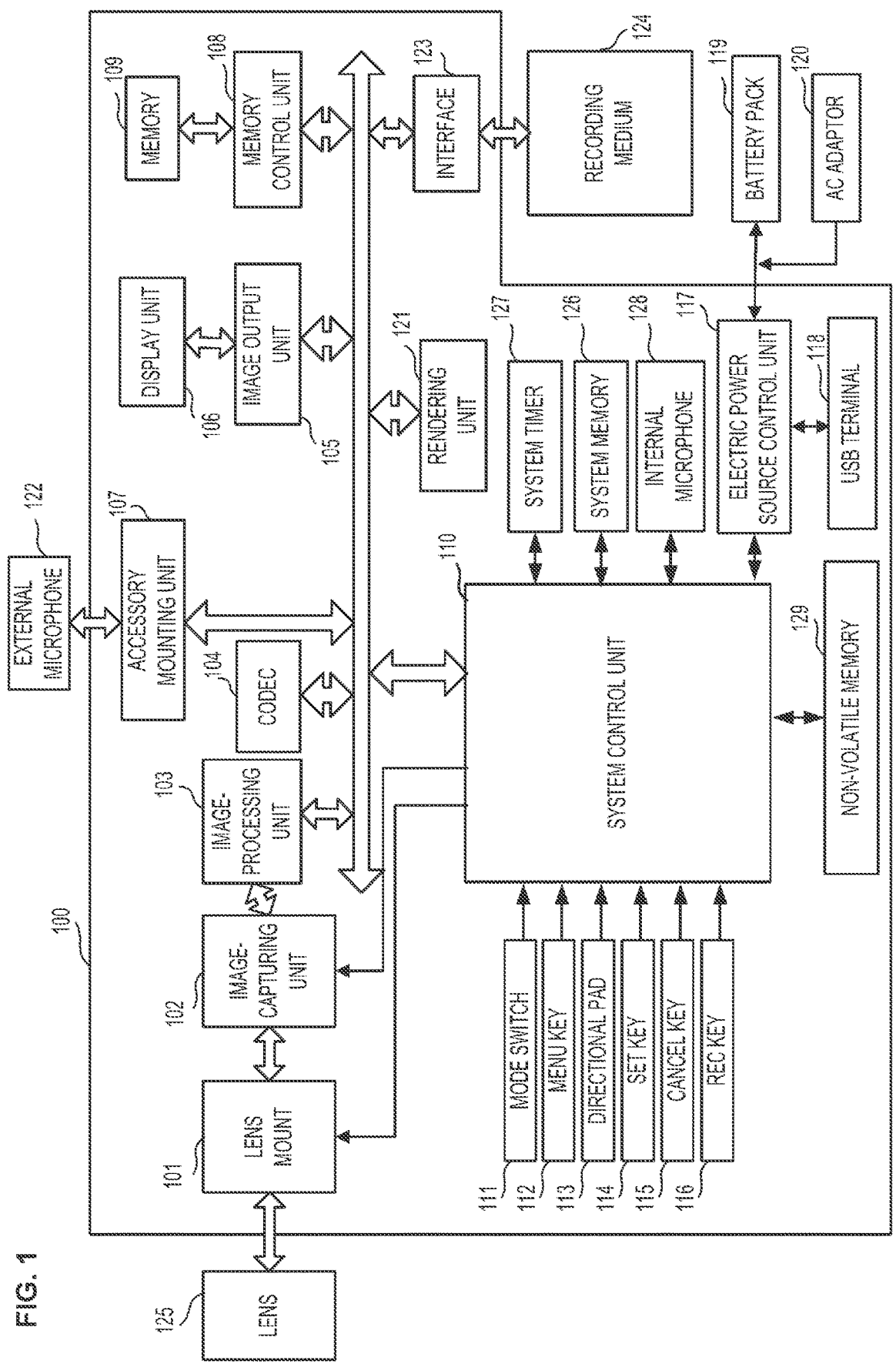
FIG. 1 is a configuration diagram of a digital camera.

A digital camera according to Embodiment 1 will be described below, with reference to the Figures. FIG. 1 is a block diagram illustrating a configuration of a digital camera 100. The digital camera 100 contains many components (functional units) within an enclosure.

A lens mount 101 is capable of mounting a lens 125 and holding the lens 125. The lens mount 101 is provided with contacts (communication contacts) for communication with the lens 125. In a case in which the digital camera 100 is in a state of insufficient electric power, the lens mount 101 stops the supply of electric power to the lens 125, on the basis of an instruction from a system control unit 110. Thus, the maximum value of electric power that the digital camera 100 consumes (hereinafter, referred to as "maximum electric power consumption") is reduced.

An image-capturing unit 102 acquires image data (captured image data) by capturing an image of a subject. The image-capturing unit 102 includes an image-capturing sensor (a sensor that converts an optical image collected at the lens 125 into electrical signals) and an analog-to-digital converter (a converter that converts analog signals into digital signals). The image-capturing sensor captures images at a predetermined framerate. The image-capturing sensor is capable of converting all pixels worth of the optical image into electrical signals (readout), or cropping out the optical image at the middle portion alone (cropping) and converting into electrical signals. Note that the electric power consumption of the image-capturing unit 102 varies in accordance with the framerate and readout mode of the image-capturing sensor. Also, in additive readout mode, in which a plurality of adjacent pixels is read out as a single pixel, the number of signals to be transmitted is smaller, and accordingly the electric power consumption of the image-capturing unit 102 can be reduced.

Image data from the image-capturing unit 102 (captured image data) or image data from a memory control unit 108 is input to an image-processing unit 103 at a predetermined framerate. The image-processing unit 103 subjects the input image data to image processing (resizing processing, trimming processing, color conversion processing, distortion correction processing, and so forth). The image-processing unit 103 outputs (stores) the image data subjected to image processing to a region generated in memory 109 (storage region) as video random-access memory (VRAM) image data. Alternatively, the image-processing unit 103 is also capable of outputting the image data prior to being subjected to such image processing (RAW image format data) without change to the memory 109 as VRAM image data. The output data amount differs depending on the format, the resolution, and the framerate of the VRAM image data that the image-processing unit 103 outputs to the memory 109, and accordingly the format and so forth of the VRAM image data affects the maximum electric power consumption.

Also, the image-processing unit 103 performs predetermined computation processing using the image data acquired by image capturing (captured image data), and the system control unit 110 performs exposure control, ranging control, and shake control on the basis of the obtained computation results. The predetermined computation processing includes functions of detecting subjects, such as faces. Thus, autofocusing (AF) processing, automatic exposure (AE) processing, and shake control processing can be performed. The image-processing unit 103 further performs predetermined computation processing using the captured image data, and subjects the obtained computation results to automatic white balance (AWB) processing on the basis of the computation results that are obtained. Further, upon decoded image data (encoded image data that has been decoded by a codec 104) being input, the image-processing unit 103 is capable of performing resizing processing and color conversion processing to generate new VRAM image data.

The codec 104 is capable of encoding VRAM image data generated by the image-processing unit 103, in accordance with a moving image compression format, such as MPEG2, H.264, or the like. Further, the codec 104 is capable of storing the encoded VRAM image data in an XMF-format or MP4-format container. Also, the codec 104 is capable of storing RAW data in a RAW-format container. The codec 104 is also capable of decoding encoded image data from the memory control unit 108, and outputting decoded image data to the memory control unit 108 as VRAM image data. Note that normally, the codec 104 sequentially encodes all VRAM image data generated at the image-processing unit 103. Conversely, in double-speed driving mode, the codec 104 performs encoding with half of the frames of the VRAM image data thinned out. That is to say, the codec 104 performs encoding and recording at a half-framerate of the framerate of the image-capturing unit 102.

An image output unit 105 reads out a plurality of pieces of image data stored in the memory 109, via the memory control unit 108. The image output unit 105 also superimposes the plurality of pieces of image data to form image signals, which are output to a display unit 106.

The display unit 106 displays images on the basis of image signals output from the image output unit 105. The display unit 106 is an organic light-emitting diode (OLED) panel, for example. The display unit 106 may be a display device according to anther format, such as a liquid crystal display (LCD) or the like. The display unit 106 may also be an eternal device connected via a High-Definition Multimedia Interface (HDMI)® or a serial digital interface (SDI). Alternatively, the display unit 106 may be an external device that receives image signals (image data) using wireless technology, such as wireless local area network (LAN), and displays images. Note that in the double-speed driving mode, images are displayed on the display unit 106 at twice the framerate of the recording framerate. In a mode other than the double-speed driving mode, images are displayed on the OLED panel at a relatively coarse framerate, such as 24p (processive scanning at 24 frames per second), in which time differences among display frames is great, and accordingly images may not appear to be smooth. Conversely, in the double-speed driving mode, images can be displayed at 48p (processive scanning at 48 frames per second), and accordingly smoothness of the images is improved.

An accessory mounting unit 107 is a mounting unit for connecting the digital camera 100 with accessory devices (peripheral equipment). The accessory mounting unit 107 may be a connecting unit that connects a cable, or may be a fixing unit that fixes an enclosure of an accessory device to the enclosure of the digital camera 100, like a hot shoe. The accessory mounting unit 107 is provided with a communication contact for the digital camera 100 and the accessory device to communicate, and an electric power source contact for supplying electric power from the digital camera 100 to the accessory device. The communication contact and the electric power source contact may be a single contact that is shared in common.

The memory control unit 108 adjusts access from each block to the memory 109.

The memory 109 stores image data that is handled by each of the image-processing unit 103, the codec 104, the image output unit 105, and a rendering unit 121. The memory 109 also temporarily stores encoded image data output from the codec 104, and encoded image data read out from a recording medium 124. The memory 109 has a sufficient recording capacity to store moving images and audio for a predetermined amount of time.

The system control unit 110 controls the entire digital camera 100. The system control unit 110 realizes the processing of each step in each flowchart which will be described later, by reading out and executing programs recorded in non-volatile memory 129 to control each functional unit. The system control unit 110 may include a plurality of central processing unit (CPU) cores. In such a case, the plurality of CPU cores may perform task-sharing processing of tasks described in the programs.

A mode switch 111 is a switch for selecting an operation mode of the digital camera 100. The mode switch 111 determines a mode (e.g., one mode of camera mode, playback mode, and electric power source mode) depending on the position of being pressed, and notifies the system control unit 110 of the mode that is determined. The camera mode is a mode for shooting a subject, and the playback mode is a mode for playback of images acquired by shooting. The electric power source mode is a mode for switching between on and off of the electric power source.

A menu key 112 is a key for instructing display or non-display of a menu screen (opening or closing the menu screen). In the state in which the menu screen is displayed, settings of the functional units of the digital camera 100 can be changed by user operations. A later-described electric power source navigation screen can be displayed by performing particular user operations in a state in which the menu screen is displayed.

A directional pad 113 is used to instruct movement of a cursor displayed on the display unit 106, for example. A SET key 114 is used to instruct selection of setting items and setting values indicated by the cursor (finalizing selection), for example. A cancel key 115 is used to instruct returning from a state partway through performing settings in the menu screen to a state immediately prior, closing the menu screen, and so forth, for example.

A REC key 116 is a key for instructing starting and stopping recording of moving images. The system control unit 110 instructs starting or stopping of processing to the codec 104 and the recording medium 124 in accordance with the REC key 116 being pressed, thereby performing moving-image recording control.

An electric power source control unit 117 includes a battery-detecting circuit, a direct current (DC)-to-DC converter, a switch circuit (a circuit for switching blocks to which electricity is provided), and so forth. The electric power source control unit 117 detects, for example, whether or not a battery pack 119 is mounted, the type of the battery pack 119, and the remaining charge in the battery pack 119. The electric power source control unit 117 also detects a connected state of the electric power source (a Universal Serial Bus (USB) electric power source connected to a USB terminal 118, the battery pack 119, and an alternating current (AC) adaptor 120), and the voltage of the electric power source. The electric power source control unit 117 then determines the electric power source from which to receive supply of electric power. Also, the electric power source control unit 117 controls the DC-to-DC converter on the basis of detection results of the connected state of the electric power source and the voltage, and on the basis of instructions from the system control unit 110. Accordingly, the electric power source control unit 117 supplies necessary voltage (electric power) to the functional units (including the lens 125, an external microphone 122, and the recording medium 124) over a period where necessary. Note that the electric power source control unit 117 converts the voltage from the electric power source, and accordingly the electric power consumption differs depending on the type of the electric power source.

The USB terminal 118 is a terminal that conforms to the universal serial bus (USB) standard. The USB terminal 118 is capable of receiving a supply of electric power from an external USB electric power source.

Examples of the battery pack 119 include primary batteries (alkaline batteries, lithium metal batteries, and so forth) and secondary batteries (nickel-cadmium (NiCd) batteries, nickel-metal hydride (NiMH) batteries, lithium (Li)-ion batteries, and so forth). The battery pack 119 is capable of supplying electric power to the electric power source control unit 117.

The AC adaptor 120 (AC electric power source) is capable of supplying electric power to the electric power source control unit 117.

The digital camera 100 can operate as long as electric power is being supplied to the electric power source control unit 117 from any one of the USB electric power source (USB terminal 118), the battery pack 119, and the AC adaptor 120. However, the maximum electric power that can be supplied (suppliable electric power, i.e., electric power supplying capabilities) differs depending on the electric power source. Accordingly, depending on the recording settings or the type of accessory device, there are cases in which the electric power that the entire digital camera 100 requests cannot be supplied from the USB electric power source or the battery pack 119, since the suppliable electric power thereof is low. In such cases, the system control unit 110 stops electric power supply to the lens 125 (or to the external microphone 122), for example, thereby controlling the electric power that the entire digital camera 100 requests. Note that when electric power supply to the lens 125 is stopped, the digital camera 100 is in a state in which the lens 125 cannot be controlled (driven), and accordingly it can be said that the digital camera 100 is not able to use the lens 125.

The rendering unit 121 performs rendering of text strings and items (icons) representing the state and settings of the digital camera 100, and the menu screen, to the storage region in the memory 109. Information of text and items is stored in the non-volatile memory 129, and the rendering unit 121 reads out and performs rendering of such information to the storage region.

The external microphone 122 is a microphone (accessory device, i.e., peripheral equipment) that acquires higher-quality audio than an internal microphone 128. The external microphone 122 is capable of acquiring high-quality audio instead of the internal microphone 128, as long as it is mounted to the accessory mounting unit 107. The audio acquired by the external microphone 122 is input to the codec 104 via the accessory mounting unit 107, as sampled digital data. The audio input to the codec 104 is encoded, and thereafter is overlaid on an image. Note that the external microphone 122 operates under supply of electric power from the digital camera 100. Accordingly, even when the external microphone 122 is mounted to the accessory mounting unit 107, in a state in which supply of electric power from the digital camera 100 to the external microphone 122 is stopped, the internal microphone 128 acquires audio. However, an arrangement may be made in which the external microphone 122 itself has an electric power source, and is operable without depending on supply of electric power from the digital camera 100.

An interface 123 is an interface as to the recording medium 124.

Data read out from the memory 109 (image data and data accompanying the image data) is recorded in the recording medium 124. The recording medium 124 also transfers image data that is recorded therein to the memory 109. The recording medium 124 may be a recording medium that is mountable to the digital camera 100 (memory card, hard disk drive, or disc), or may be a recording medium built into the digital camera 100 (flash memory or hard disk drive).

The lens 125 is an externally attachable lens. The lens 125 has a focus mechanism, a zoom mechanism, a diaphragm, and an image-stabilizing mechanism. The lens 125 performs lens control (driving a focusing lens, driving the diaphragm, driving an image-stabilizing lens, and so forth), on the basis of control commands received from the lens mount 101. Various types of lenses (large-diameter super-telephoto lenses, lightweight short-focal-length lenses, and so forth) can be mounted to the digital camera 100 as the lens 125, in accordance with the subject (object of shooting). Lenses of a different mount standard from that of the lens mount 101 can also be mounted as the lens 125 to the digital camera 100 by going through a mount adapter, which is omitted from illustration. Note that the electric power necessary for each type of lens control differs in accordance with the type of the lens 125 mounted to the digital camera 100.

Random-access memory (RAM), for example, is used for system memory 126. Constants, variables, programs, and so forth, are loaded to the system memory 126. The system control unit 110 also performs display control of the display unit 106 by controlling the memory 109, the rendering unit 121, and the image output unit 105. The system memory 126 may be shared in common with the memory 109. In this case, the digital camera 100 may be separately provided with small-capacity memory that is accessible at high speeds, directly connected to the system control unit 110, since memory access is adjusted by the memory control unit 108.

A system timer 127 is a timing unit that measures time used for various types of control and time of a built-in clock.

The internal microphone 128 acquires audio in a case in which the external microphone 122 is not mounted to the accessory mounting unit 107. The internal microphone 128 is capable of operating with smaller electric power consumption as compared to the external microphone 122.

The non-volatile memory 129 is non-volatile memory that is electrically erasable and recordable. Examples of the non-volatile memory 129 include electrically erasable programmable read-only memory (EEPROM), and so forth. Constants, programs and so forth, for the system control unit 110 to operate, are recorded in the non-volatile memory 129. The programs recorded in the non-volatile memory 129 include programs for executing the later-described various types of flowcharts.

The electric power supplied to the digital camera 100 (the electric power usable by the digital camera 100) differs depending on the type of electric power source (the USB electric power source connected to the USB terminal 118, the battery pack 119, and the AC adaptor 120) supplying electric power to the digital camera 100. Further, the maximum electric power consumption of the entire digital camera 100 varies depending on the situation (state of settings) at each functional unit. In particular, the maximum electric power consumption changes depending on (1) the type of the lens 125 (lens type), (2) a sensor mode of the image-capturing unit 102 (effective region of image-capturing sensor), (3) a recording format and framerate of image data (recording framerate), and (4) whether or not an external microphone 122 is mounted.

There are two types of the lens 125 (lens type), which are lenses for mirrorless cameras and lenses for single-lens reflex cameras, for example. Note that the lens types are not limited to these, and may be any type such as type in accordance with size or driving method of the lens, as long as the lens type affects the maximum electric power consumption of the digital camera 100.

As for the sensor mode, there is a full-size mode in which image-capturing is performed using the full image-capturing face of the image-capturing unit 102, for example. Further, other sensor modes include a Super 35 mm mode in which image-capturing is performed using a 24 mm×14 mm range at the center portion of the image-capturing face, and a Super 16 mm mode in which image-capturing is performed using a 12.5 mm×7.4 mm range at the center portion of the image-capturing face. Accordingly, the sensor mode is a mode of the image-capturing sensor in accordance with the effective region.

The recording format of the image data is the format by which the image data is recorded in the memory 109. An example of a recording format is the RAW image format, which is the format of the image data itself that the image-capturing unit 102 has acquired (captured image data, i.e., RAW data). Further, the Moving Picture Experts Group (MPEG) format, which is a format of image data that is encoded in accordance with the MPEG moving image compression standard, may be used as the recording format. Also, the MP4 format, which is a format of image data that is encoded in accordance with the MPEG-4 Advanced Video Coding (AVC) moving image compression standard, may be used as the recording format.

(Regarding Conditions Display Processing) Conditions display processing (display method, i.e., display control method) for displaying conditions (usage conditions) for each type of factor of the digital camera 100 that is usable without limiting operations of the digital camera 100 will be described with reference to a flowchart shown in FIG. 2. The conditions display processing will be described below with reference to screens illustrated in FIGS. 3A to 3D, 4A to 4D, 5A and 5B (screens displayed on the display unit 106). FIGS. 3B to 3D, 4A to 4D, 5A and 5B illustrate electric power source navigation screens for determining and displaying conditions (usage conditions) of each type of factor in the digital camera 100. First, the overall conditions display processing will be described with reference to the flowchart shown in FIG. 2, following which details of the processing in which the user selects conditions (processing included in the conditions display processing) will be described with reference to flowcharts shown in FIGS. 6A, 6B, 7A and 7B. Note that the term "limiting operations of the digital camera 100" refers to particular operations not being performed under conditions set (selected) by the users, operation speed being slower than particular operations under normal conditions, particular operations not being able to be realized at all, or so forth.

The conditions display processing is processing of displaying usage conditions of each factor such that the maximum electric power consumption of the digital camera 100 is not more than electric power that can be supplied from the electric power sources to the digital camera 100 (hereinafter referred to as "suppliable electric power") without limiting operations of the digital camera 100. The suppliable electric power is determined on the basis of the type of the electric power source. The maximum electric power consumption is determined at least on the basis of a plurality of factors, including the types of electric power sources. In the conditions display processing, upon the user selecting conditions regarding at least one factor out of a plurality of factors relating to shooting, the digital camera 100 determines conditions regarding other factors, in accordance with the selection performed by the user. The digital camera 100 then notifies the user of the conditions that have been determined (displays on the display unit 106). Note that the electric power consumed by the digital camera 100 also includes electric power consumed by supplying electric power to the lens 125 and the external microphone 122 (electric power supplied externally from the digital camera 100). Note that hereinafter, the term "usage conditions" refers to conditions under which the maximum electric power consumption is not more than the suppliable electric power without limiting operations of the digital camera 100 when shooting (specifically, without stopping electric power supply to the lens 125).

Note that in Embodiment 1, the plurality of factors will be lens type, recording settings, whether or not to perform double-speed driving (use/non-use of double-speed driving mode), the electric power source type, and whether or not to perform electric power feeding (microphone electric power feeding) to the external microphone 122 (microphone accessory). However, the plurality of factors is not limited to those related to shooting, and any factors may be included as long as they are factors in which the maximum electric power consumption or suppliable electric power changes in accordance with conditions. Note that recording settings are settings regarding the sensor mode, the recording format, and the framerate (framerate for storing image data in the memory 109).

Figure 2:
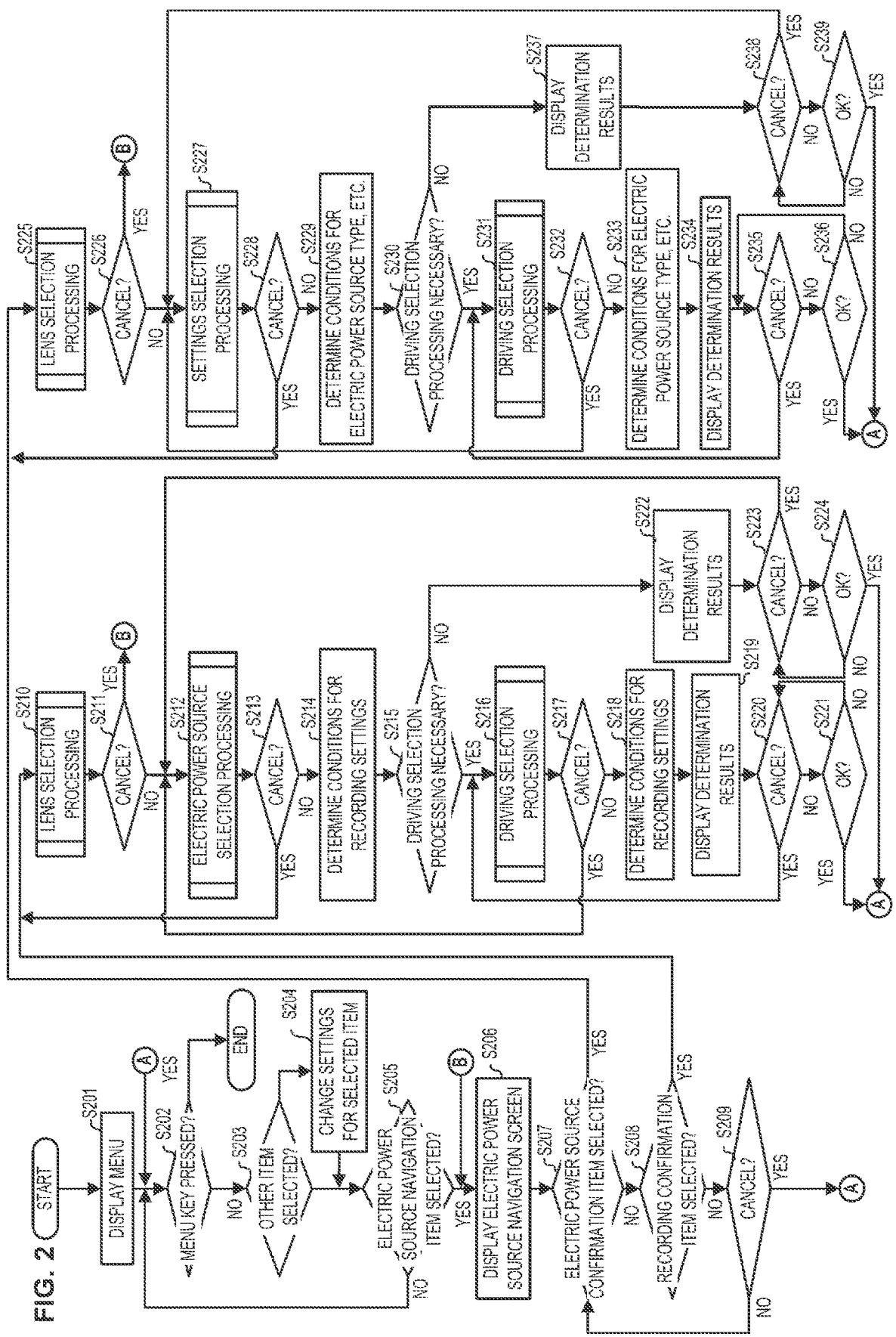
FIG. 2 is a flowchart showing conditions display processing.

FIG. 2 is a flowchart showing conditions display processing (electric power source navigation) for displaying usage conditions of the digital camera 100. The processing of each step in this flowchart is realized by the system control unit 110 loading programs stored in the non-volatile memory 129 to the system memory 126 and executing the programs.

Hereinafter, a "cancel operation" means to press the cancel key 115 or to select a "cancel" item by a touch operation or the like (in a case in which a "cancel" item is displayed in the screen that the display unit 106 displays). An "OK operation" means to press the SET key 114 or to select an "OK" item by a touch operation or the like (in a case in which an "OK" item is displayed in the screen that the display unit 106 displays).

Figure 3A:
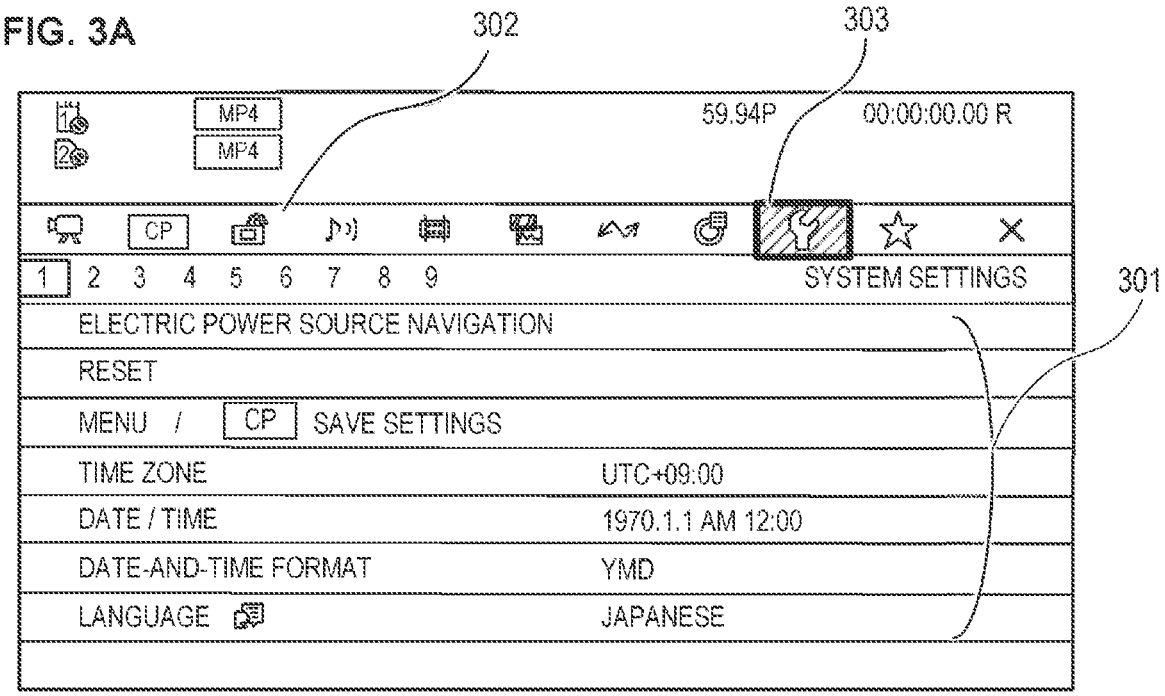
FIGS. 3A to 3D are diagrams illustrating screens on a display unit in conditions displaying processing.

In S201, the system control unit 110 displays a menu screen on the display unit 106, such as illustrated in FIG. 3A, for selecting items for settings relating to the digital camera 100.

In the menu screen, an item list 301 is an item list that includes an item "electric power source navigation", which is an item for determining usage conditions of the digital camera 100. Tabs 302 are tabs indicating categories of items (major items of the menu). A cursor 303 is a heavy frame that can point to either one of the tabs 302 and the item list 301. When the tab 302 that the cursor 303 is pointing to is changed, the item list that is displayed is changed to a different item list. The position of the cursor 303 is moved by user operations of the directional pad 113.

In S202, the system control unit 110 determines whether or not the menu key 112 has been pressed by the user. In a case in which determination is made that the menu key 112 has been pressed, the processing of this flowchart ends, and otherwise, the flow advances to S203.

In S203, the system control unit 110 determines whether or not an item other than the "electric power source navigation" item (electric power source navigation item) in the menu screen has been selected, in accordance with user operations using the directional pad 113 and the SET key 114. Note that the user can change the item that the cursor points to by operating the directional pad 113, and can select the item that the cursor points to by pressing the SET key 114. In a case of determining an item other than the electric power source navigation item to have been selected, the flow advances to S204, and otherwise, the flow advances to S205.

In S204, the system control unit 110 changes the settings of the item selected in S203. For example, according to the processing in S203 and S204, the system control unit 110 can change the settings such as the sensor mode, the recording format, the framerate, use/non-use of the double-speed driving mode, and so forth.

In S205, the system control unit 110 determines whether or not the "electric power source navigation" item (electric power source navigation item) has been selected from the menu screen by user operations of the directional pad 113 and the SET key 114. In a case of determining that the electric power source navigation item has been selected, the flow advances to S206, and otherwise, the flow returns to S201.

Figure 3B:
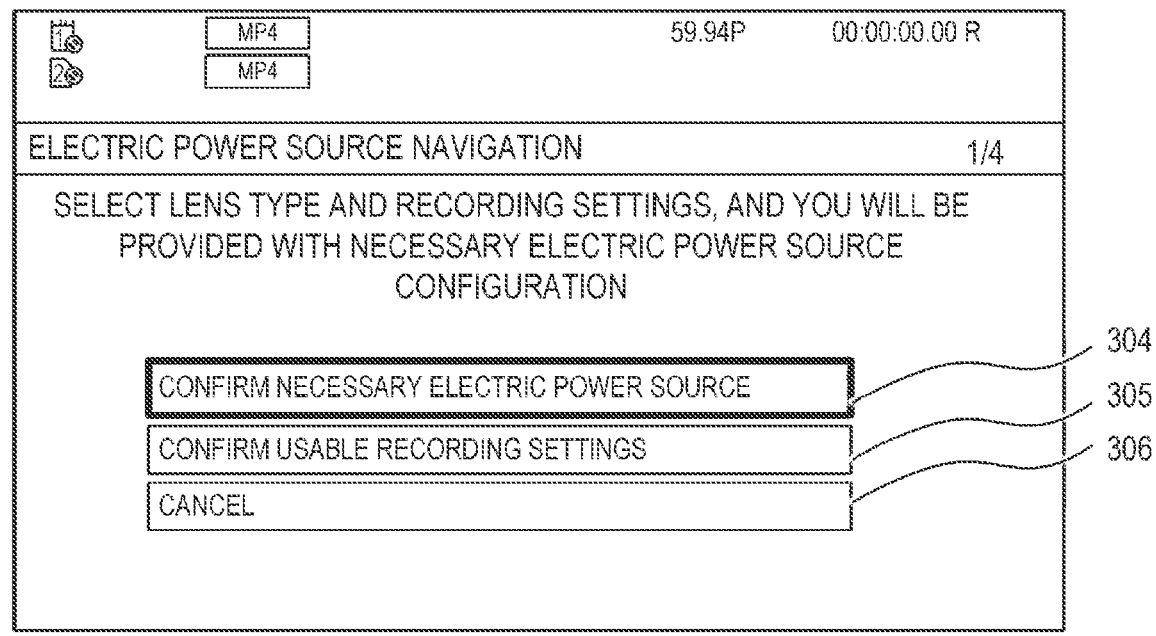

In S206, the system control unit 110 displays an electric power source navigation screen on the display unit 106, such as illustrated in FIG. 3B, for determining usage conditions of the digital camera 100.

In the electric power source navigation screen, an electric power source confirmation item 304, a recording confirmation item 305, and a cancel item 306 are displayed. The electric power source confirmation item 304 is an item for displaying conditions and so forth of electric power source types that are usable, on the basis of conditions of factors selected by the user (conditions regarding lens type and conditions regarding recording settings), without limiting operations of the digital camera 100 under the conditions of these factors. The recording confirmation item 305 is an item for displaying conditions of recording settings that are usable, on the basis of conditions of factors selected by the user (conditions regarding lens type and conditions regarding electric power source type), without limiting operations of the digital camera 100 under the conditions of these factors. In the example in FIG. 3B, the electric power source confirmation item 304 is pointed to by the cursor (heavy frame).

In S207, the system control unit 110 determines whether or not the electric power source confirmation item 304 has been selected by user operations from the electric power source navigation screen. In a case of determining that the electric power source confirmation item 304 has been selected, the flow advances to S225, and otherwise, the flow advances to S208.

In S208, the system control unit 110 determines whether or not the recording confirmation item 305 has been selected by user operations from the electric power source navigation screen. In a case of determining that the recording confirmation item 305 has been selected, the flow advances to S210, and otherwise, the flow advances to S209.

In S209, the system control unit 110 determines whether or not the cancel item 306 has been selected by user operations in the electric power source navigation screen. In a case of determining that the cancel item 306 has been selected, the flow returns to S202, and otherwise, the flow advances to S207. The flow also returns to S202 in a case in which the cancel key 115 has been pressed, as well.

In S210, the system control unit 110 executes lens selection processing (see FIG. 6A), in which the user is caused to select conditions of the type (lens type) of the lens 125 to be driven (used) when shooting. Information of the conditions of the lens type selected in the lens selection processing is stored in the system memory 126 as information of "selected lens type". Note that in the lens selection processing, a lens selection screen for selecting the conditions of the lens type to be used when shooting, such as illustrated in FIG. 3C, is displayed.

Figure 3C:
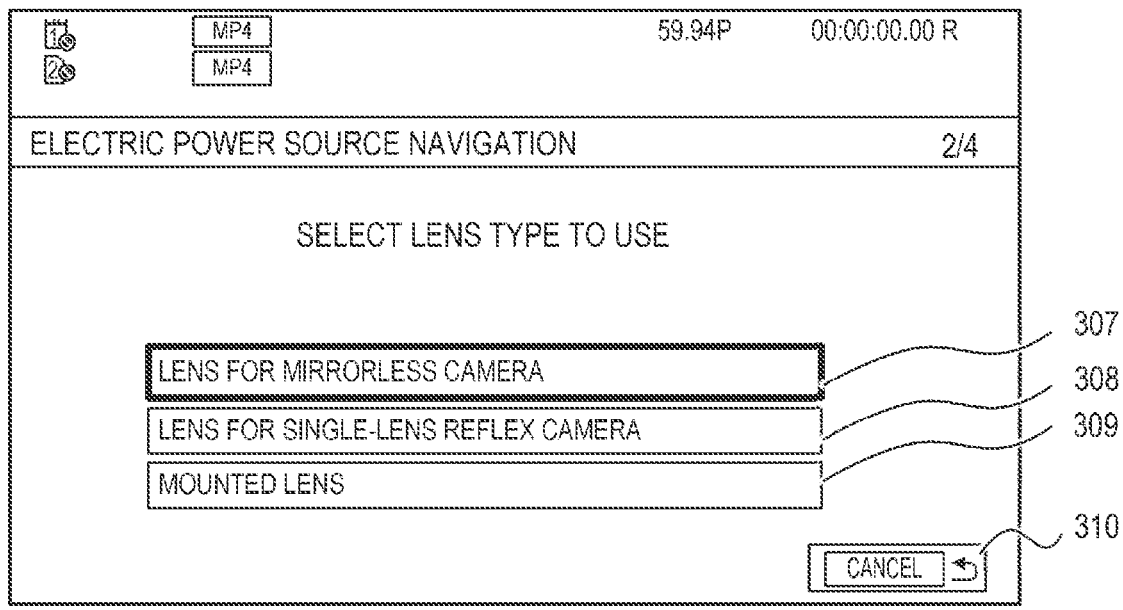

In the lens selection screen illustrated in FIG. 3C, an item 307 is an item used for selecting a lens for a mirrorless camera, as the lens type to be used when shooting. The item 307 is pointed to by the cursor in the example in FIG. 3C. An item 308 is an item used for selecting a lens for a single-lens reflex camera, as the lens type to be used when shooting. An item 309 is an item for selecting the type of the lens 125 that is currently mounted to the digital camera 100 as the lens type to be used when shooting. A guide 310 is a guide (item) indicating returning to the screen immediately prior to the screen that is displayed, by pressing the cancel key 115 (cancelling). Note that in Embodiment 1, the two types (items) of lens for a mirrorless camera and lens for a single-lens reflex camera are provided, since the electric power that the digital camera 100 consumes is different between these two. However, any type may be provided, such as type in accordance with size or driving method of the lens, as long as types (items) regarding which the electric power that the digital camera 100 consumes is different.

In S211, the system control unit 110 determines whether or not the user has performed a cancel operation in the lens selection processing (S617). In a case of determining a cancel operation to have been performed, the flow returns to S206, and otherwise, the flow advances to S212.

In S212, the system control unit 110 executes electric power source selection processing (see FIG. 6B), in which the user is caused to select conditions of the electric power source type used when shooting, and conditions of whether or not to perform microphone electric power feeding. Information of the conditions of the electric power source selected in the electric power source selection processing is stored in the system memory 126 as information of "selected electric power source type". Information of the conditions of whether or not to perform microphone electric power feeding selected in the electric power source selection processing is stored in the system memory 126 as information of "electric power feed selection". Note that in the electric power source selection processing, an electric power source selection screen for selecting the conditions of the electric power source type used when shooting, and conditions of whether or not to perform microphone electric power feeding, such as illustrated in FIG. 3D, is displayed on the display unit 106.

Figure 3D:
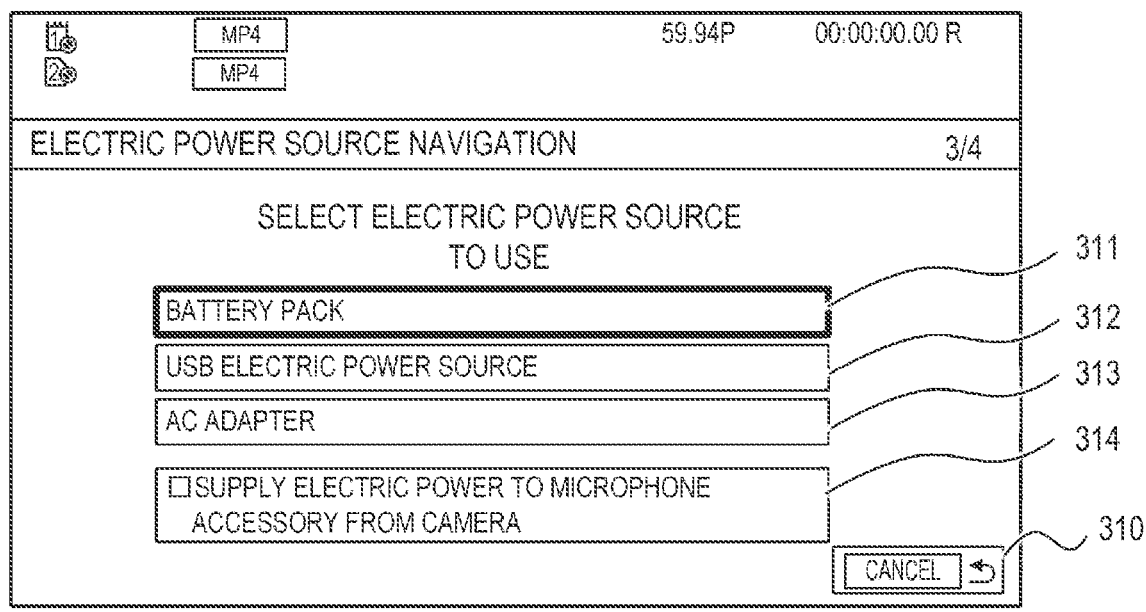

In the electric power source selection screen illustrated in FIG. 3D, an item 311 is an item for selecting the battery pack as the electric power source type to be used when shooting. The item 311 is pointed to by the cursor in FIG. 3D. An item 312 is an item for selecting the USB electric power source as the electric power source type to be used when shooting. An item 313 is an item for selecting the AC adapter as the electric power source type to be used when shooting. An item 314 is an item for selecting whether or not to perform microphone electric power feeding (supplying electricity from the digital camera 100 to the external microphone 122), by whether or not a checkbox is checked. The user selects one of the items 311 to 313, and also selects whether or not to check the checkbox of item 314.

In S213, the system control unit 110 determines whether or not the user has performed a cancel operation in the electric power source selection processing (S624). In a case of determining a cancel operation to have been performed, the flow returns to S210, and otherwise, the flow advances to S214.

In S214, the system control unit 110 determines usage conditions of the recording settings, on the basis of the information of "selected lens type", "selected electric power source type", and "electric power feed selection". The system control unit 110 determines the usage conditions for the recording settings by referencing a determination table shown in FIG. 8. The determination table shows whether or not the digital camera 100 can be used without operations being limited when shooting, for each combination of conditions of a plurality of factors (lens type, recording settings, whether or not to perform double-speed driving, electric power source type, and whether or not to perform microphone electric power feeding). That is to say, the determination table shows combinations of conditions of the plurality of factors in which the maximum electric power consumption can be kept to not more than the suppliable electric power, without stopping supply of electric power to the lens 125 while shooting. More specifically, the determination table shows that combinations of the electric power source types (battery pack, USB electric power source, AC adapter) indicated by circle marks will have maximum electric power consumption not more than the suppliable electric power when shooting. The determination table is stored in the non-volatile memory 129 in advance.

For example, a case will be assumed in which the "selected lens type" indicates a lens for a mirrorless camera, the "selected electric power source type" indicates a battery pack, and "electric power feed selection" indicates that microphone electric power feeding will be performed. In this case, the system control unit 110 can determine from the example in FIG. 8 that conditions of recording settings corresponding to at least rows of Nos. 4 to 8 and 16 can be set as usage conditions for recording settings. For example, the system control unit 110 can determine conditions in which the sensor mode is full-size mode, the recording format is RAW format, and the framerate is any of 1 to 30 fps (conditions corresponding to No. 4) are usage conditions for recording settings.

In S215, on the basis of the determination results of the usage conditions for recording settings in S214, the system control unit 110 determines whether or not the usage conditions for recording settings will change in accordance with whether or not to perform double-speed driving (driving selection processing shown in FIG. 7A is necessary). In a case of determination being made that the usage conditions for recording settings will change in accordance with whether or not to perform double-speed driving, the flow advances to S216, and otherwise, the flow advances to S222.

For example, a case will be assumed in which the "selected lens type" indicates a lens for a single-lens reflex camera, the "selected electric power source type" indicates a battery pack, and "electric power feed selection" indicates that microphone electric power feeding will be performed. In this case, in S214 the system control unit 110 can determine from the example in FIG. 8 that conditions of recording settings corresponding to at least row of No. 12 can be set as usage conditions for recording settings. Now, No. 12 shows conditions in which the double-speed driving mode is not used, and No. 11 that shows the same recording settings as No. 12 shows conditions in which the double-speed driving mode is used. However, it can be seen from the determination table in FIG. 8 that in a case in which the "selected electric power source type" indicates a battery pack and "electric power feed selection" indicates that microphone electric power feeding will be performed, the digital camera 100 cannot be used when shooting under the conditions of the factors shown in No. 11. Accordingly, in a case of using the double-speed driving mode, the system control unit 110 cannot select the conditions of the recording settings shown in No. 11 as the usage settings. Accordingly, in a case in which the "selected lens type" indicates a lens for a single-lens reflex camera, the "selected electric power source type" indicates a battery pack, and "electric power feed selection" indicates that microphone electric power feeding will be performed, as described above, determination is made that the usage conditions for recording settings will change in accordance with whether or not to perform double-speed driving.

In S216, the system control unit 110 executes driving selection processing (see FIG. 7A) that is processing for causing the user to select conditions of whether or not to use the double-speed driving mode when shooting (whether or not to perform double-speed driving). Upon the driving selection processing being performed, the information of conditions for whether or not to perform double-speed driving, selected by the user, is stored in the system memory 126 as information of "double-speed driving conditions". Also, a driving selection screen such as illustrated in FIG. 4A, for selecting conditions of whether or not to use the double-speed driving mode when shooting, is displayed in the driving selection processing.

Figure 4A:
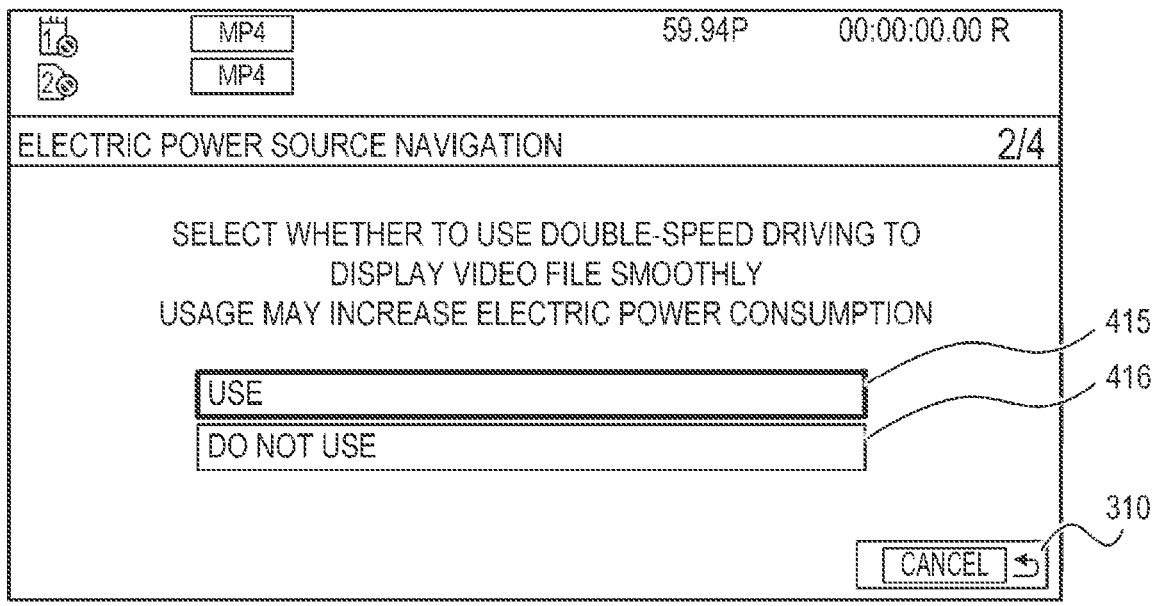
FIGS. 4A to 4D are diagrams illustrating screens on the display unit in conditions displaying processing.

In the driving selection screen illustrated in FIG. 4A, an item 415 of "use" is an item indicating that the double-speed driving mode is to be used when shooting. The item 415 is pointed to by the cursor. An item 416 of "do not use" is an item indicating that the double-speed driving mode is not to be used.

Thus, determination is made in S215 regarding whether or not the usage conditions for recording settings will change in accordance with whether or not to perform double-speed driving. In a case in which the usage conditions for recording settings will not change in accordance with whether or not to perform double-speed driving, driving selection processing for causing the user to select whether or not to perform double-speed driving is not performed (i.e., usage conditions for recording settings are determined regardless of whether or not to perform double-speed driving). Accordingly, the digital camera 100 can smoothly indicate usage conditions for recording settings without placing an excessive load on the user regarding operations.

In S217, the system control unit 110 determines whether or not the user has performed a cancel operation in the driving selection processing (S713). In a case in which determination is made that a cancel operation has been performed, the flow returns to S212, and otherwise, the flow advances to S218.

In S218, the system control unit 110 determines the usage conditions for the recording settings, on the basis of information of "selected lens type", "electric power source type", "electric power feed selection", and "double-speed driving conditions", using the determination table shown in FIG. 8, in the same way as in S214.

Figure 4B:
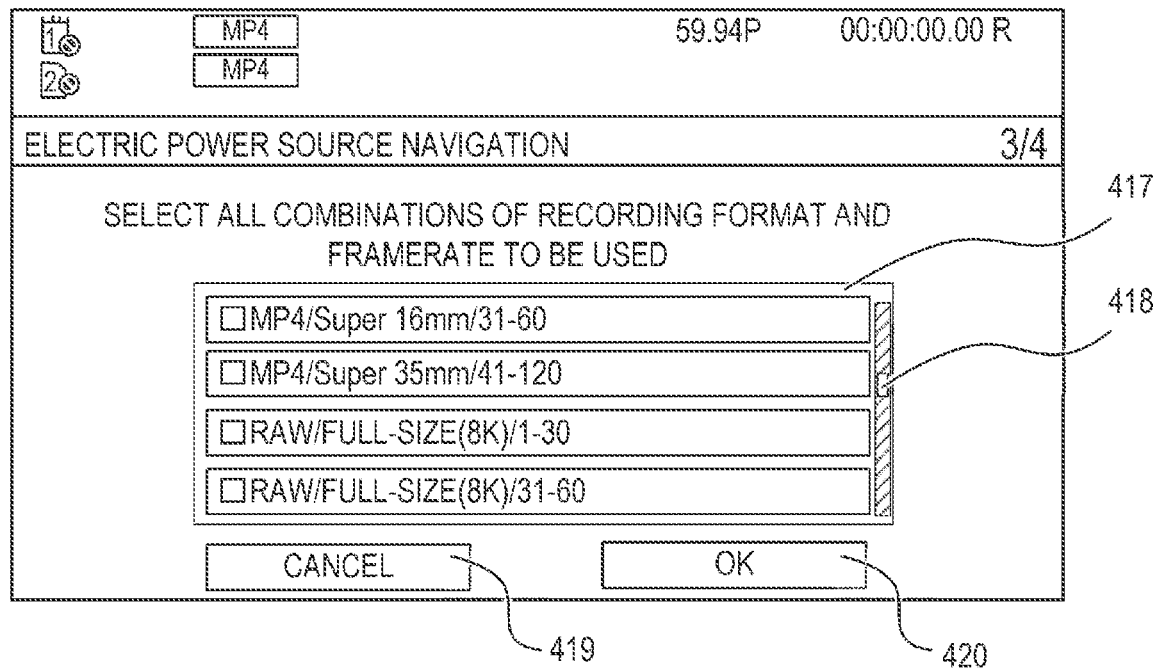
Figure 4C:
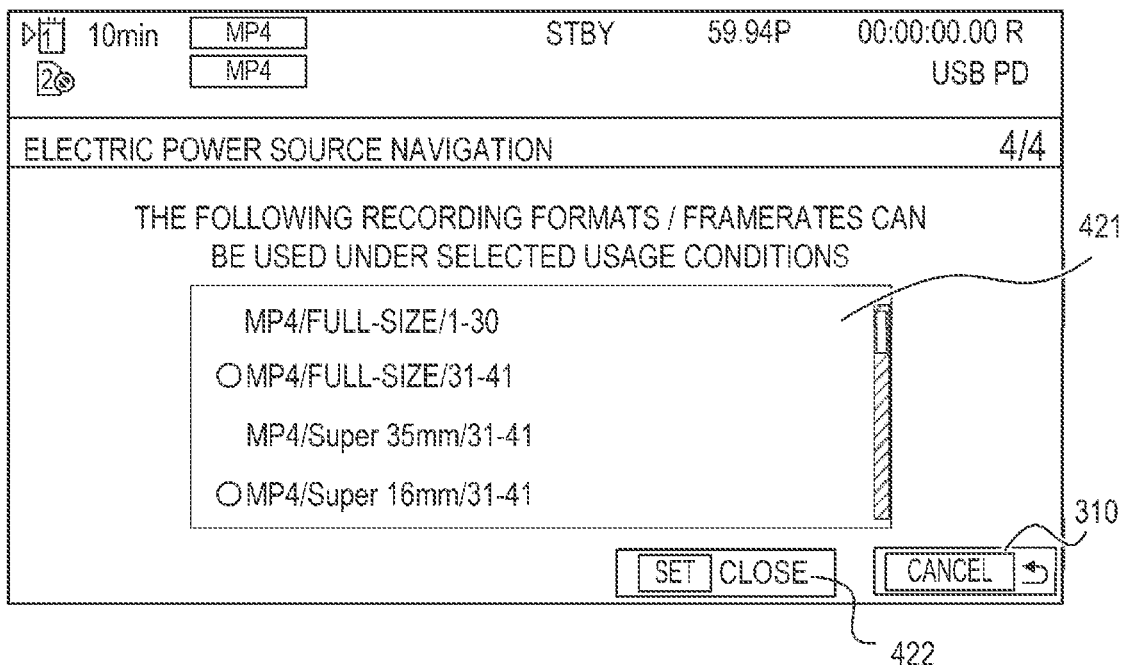

In S219, the system control unit 110 displays a list of determination results (usage conditions of recording settings) of S218, in a determination results screen illustrated in FIG. 4C.

In the determination results screen, a list 421 is a list indicating conditions for a plurality of recording settings (i.e., combinations of recording format, sensor mode, and framerate). In the list 421, conditions (items) for recording settings that are usable are indicated by circle marks. A guide 422 indicates that pressing the SET key 114 will end the conditions display processing (electric power source navigation). Note that the list 421 illustrated in FIG. 4C displays a full list indicating conditions of the plurality of recording settings with circle marks being appended to conditions that are usable, indicating that only conditions with the circle marks appended are usable, but this is not limiting. That is to say, instead of displaying the full list of conditions of the plurality of recording settings, an arrangement may be made in which a list display is made only of those that are usable, i.e., those in the list 421 in FIG. 4C with circle marks appended.

Note that in this flowchart, the processing of S210 and S211 may be omitted. In this case, the system control unit 110 displays the usage conditions for recording settings for each lens type in S219 in a table format, for example, by displaying the screen illustrated in FIG. 5A on the display unit 106. Accordingly, the load on the user selecting conditions by lens type in the lens selection processing can be reduced, for example. Also, the user can more readily comprehend usage conditions to use by the display that has higher perspicuity.

In S220, the system control unit 110 determines whether or not a cancel operation has been performed by the user in the determination results screen. In a case of determining that a cancel operation has been performed, the flow returns to S216, and otherwise, the flow advances to S221.

In S221, the system control unit 110 determines whether or not an OK operation (selection of an "OK" item or pressing of the SET key 114) has been performed by the user in the determination results screen. In a case of determining that an OK operation has been performed, the flow returns to S202, and otherwise, the flow returns to S220.

In S222, the system control unit 110 displays the usage conditions of recording settings (determination results of S214) in the determination results screen illustrated in FIG. 4C, in the same way as in S219.

In S223, the system control unit 110 determines whether or not a cancel operation has been performed by the user in the determination results screen. In a case of determining that a cancel operation has been performed, the flow returns to S212, and otherwise, the flow advances to S224.

In S224, the system control unit 110 determines whether or not an OK operation has been performed by the user in the determination results screen. In a case of determining that an OK operation has been performed, the flow returns to S202, and otherwise, the flow returns to S223.

In S225, the system control unit 110 executes lens selection processing (see FIG. 6A), in which information of the conditions of the lens type that the user has selected is acquired as information of "selected lens type", in the same way as in S210.

In S226, the system control unit 110 determines whether or not a cancel operation has been performed by the user in the lens selection processing (S617). In a case of determining that a cancel operation has been performed, the flow returns to S206, and otherwise, the flow advances to S227.

In S227, the system control unit 110 executes settings selection processing (see FIG. 7B) that is processing causing the user to select conditions of the recording settings (sensor mode, recording format, and framerate) used when shooting. Information of conditions of the recording settings selected by the user in the settings selection processing is stored in the system memory 126 as information of "selected recording settings". In the settings selection processing, a settings selection screen such as illustrated in FIG. 4B, for selecting conditions for recording settings to use when shooting, is displayed.

In the settings selection screen illustrated in FIG. 4B, an item group 417 is an item group of recording settings (i.e., a combination of recording format, sensor mode, and framerate). A plurality of items, each indicating different recording settings, is displayed in the item group 417. The user can select one or a plurality of items by checking checkboxes corresponding to the items in the item group 417. A scrollbar 418 indicates a display range of the item group of the recording settings. Moving (scrolling) the position of the scrollbar 418 changes the items of recording settings that are displayed. A "cancel" item 419 is an item for returning the screen to the screen immediately prior. An "OK" item 420 is an item for finalizing selection of the items of recording settings. Note that the recording settings may also be one of the recording format, sensor mode, and framerate, or a combination of two of these.

In S228, the system control unit 110 determines whether or not a cancel operation has been performed by the user in the settings selection processing (S724). In a case of determining that a cancel operation has been performed, the flow returns to S225, and otherwise, the flow advances to S229.

In S229, the system control unit 110 references the determination table shown in FIG. 8, and determines usage conditions of electric power source type and usage conditions of whether or not to perform microphone electric power feeding, on the basis of information of "selected lens type" and "selected recording settings".

For example, a case will be assumed in which the "selected lens type" indicates a lens for a single-lens reflex camera, the sensor mode is the full-size mode, the recording format is the RAW format, and the framerate is 20 fps, in the "selected recording settings". In this case, in the example in FIG. 8, the conditions indicated by the "selected lens type" and the "selected recording settings" match the conditions (conditions of lens type and conditions of recording settings) shown in rows Nos. 11 and 12. Accordingly, the system control unit 110 can determine that if the double-speed driving mode is not used, for example, all electric power source types (battery pack, USB electric power source, and AC adapter) are selectable as usage conditions for the electric power source types. Also, the system control unit 110 can determine that if the double-speed driving mode is used, and also microphone electric power feeding is performed, the AC adapter is selectable as usage conditions for the electric power source type. Further, the system control unit 110 can determine that if the double-speed driving mode is used, and also microphone electric power feeding is not performed, the AC adapter and the USB electric power source are selectable as usage conditions for the electric power source type.

In S230, on the basis of the determination results in S229, the system control unit 110 determines whether or not the usage conditions (determination results) for electric power source type and whether or not to perform microphone electric power feeding will change in accordance with whether or not to perform double-speed driving. In a case of determining that the determination results will change, the flow advances to S231, and otherwise, the flow advances to S237.

In S231, the system control unit 110 executes driving selection processing (see FIG. 7A) for acquiring information of conditions for whether or not to perform double-speed driving that the user has selected as information of "double-speed driving conditions".

In S232, the system control unit 110 determines whether or not a cancel operation has been performed by the user in the driving selection processing (S713). In a case of determining that a cancel operation has been performed, the flow returns to S227, and otherwise, the flow advances to S233.

In S233, the system control unit 110 references the determination table shown in FIG. 8, and determines usage conditions of electric power source type and usage conditions of whether or not to perform microphone electric power feeding, on the basis of information of "selected lens type", "selected recording settings", and "double-speed driving conditions".

Figure 4D:
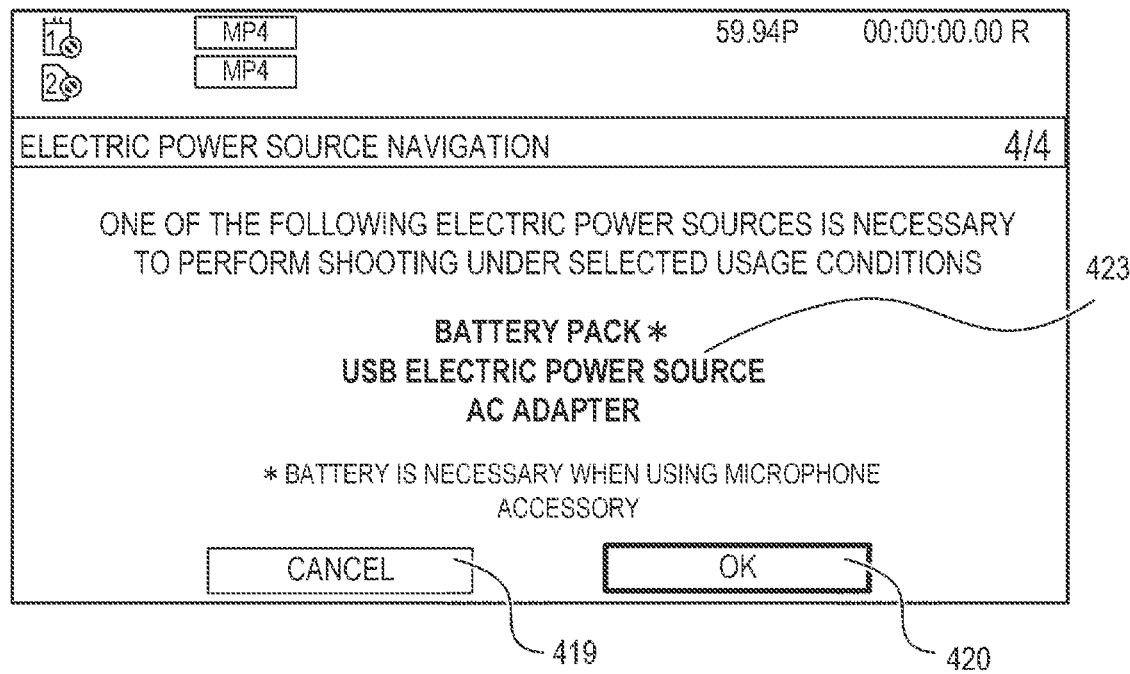
Figure 5A:
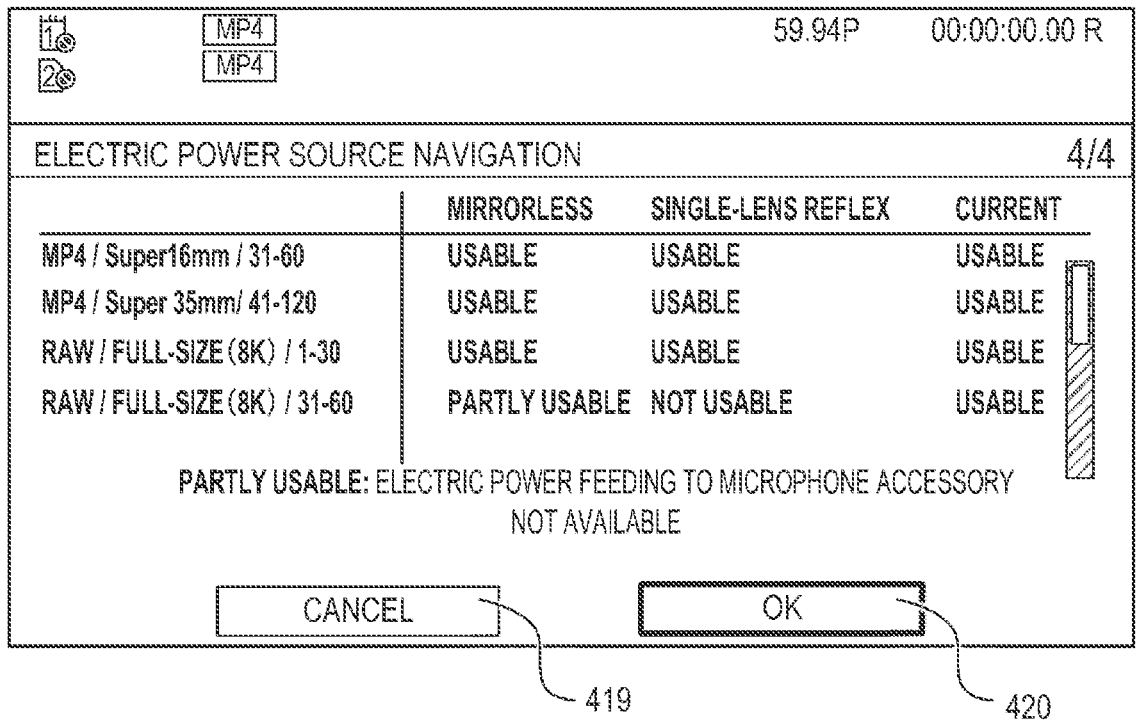
FIGS. 5A and 5B are diagrams illustrating screens on the display unit in conditions displaying processing.
Figure 5B:
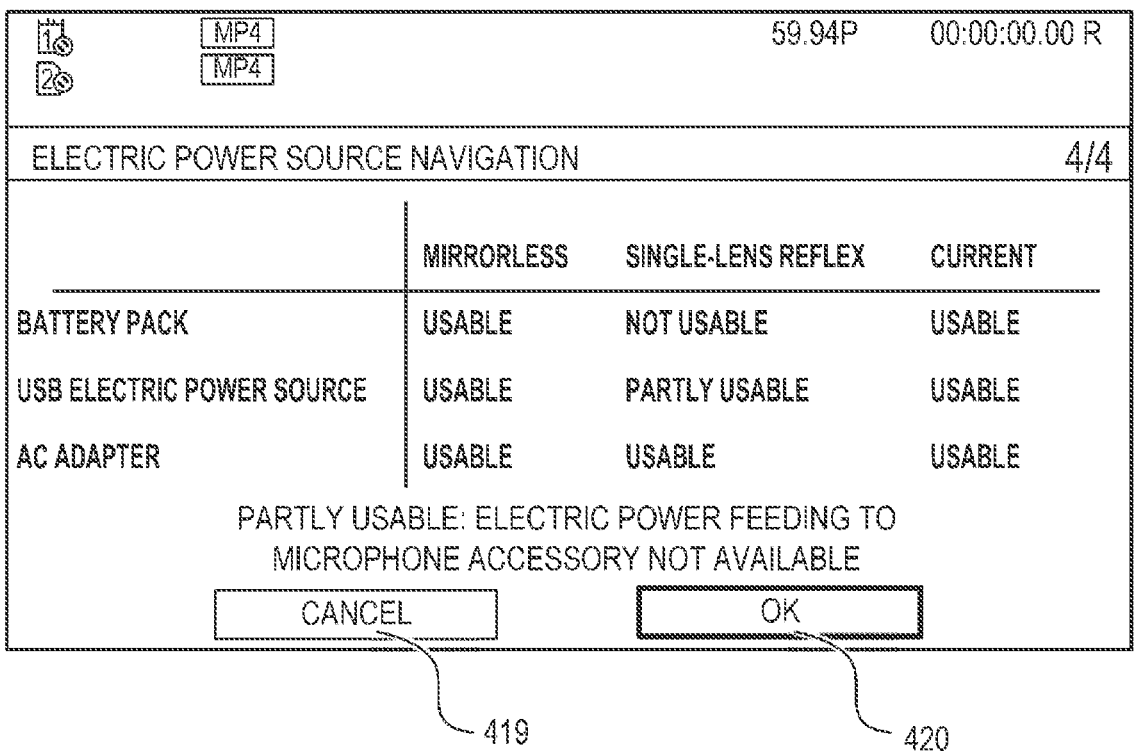

In S234, on the basis of the determination in S233, the system control unit 110 displays the usage configuration of electric power source configuration (usage conditions of electric power source type and usage conditions of whether or not to perform microphone electric power feeding) in an electric power source determination screen illustrated in FIG. 4D. A list display 423 displays a list showing usable electric power source types. In the list display 423, items appended with an asterisk (*) mark are not able to perform electric power feeding from the digital camera 100 to the external microphone 122 in a case of performing shooting using the electric power source of this electric power source type indicated by this item. Also, indication is made in FIG. 4D that the external microphone 122 needs to receive electric power feeding from a battery provided within itself, in a case of using the external microphone 122 while performing shooting using the electric power source of the electric power source type indicated by the item appended with the asterisk (*) mark.

Thus, in S234, the system control unit 110 indicate usage conditions including conditions of whether or not to perform microphone electric power feeding. Accordingly, the user can correctly know whether or not the external microphone 122 that requires electric power feeding can be used under the recording settings and lens type conditions that have been selected.

Note that in a case in which the user has selected a plurality of conditions for recording settings in S227 (settings selection processing), in S234 the system control unit 110 displays conditions of the electric power source configuration where the maximum electric power consumption is not more than the suppliable electric power under each one of the plurality of conditions, as the usage conditions.

Note that S225 and S226 may be omitted. In this case, the system control unit 110 displays various types of usage conditions for each lens type in S234 in a table format, by displaying an electric power source determination screen illustrated in FIG. 5B.

In S235, the system control unit 110 determines whether or not a cancel operation has been performed in the electric power source determination screen. In a case of determining that a cancel operation has been performed, the flow returns to S231, and otherwise, the flow advances to S236.

In S236, the system control unit 110 determines whether or not an OK operation has been performed in the electric power source determination screen. In a case of determining that an OK operation has been performed, the flow returns to S202, and otherwise, the flow returns to S235.

In S237, the system control unit 110 displays the usage conditions of the electric power source configuration (determination results of S229) in the electric power source determination screen, in the same way as in S234.

In S238, the system control unit 110 determines whether or not a cancel operation has been performed in the electric power source determination screen. In a case of determining that a cancel operation has been performed, the flow returns to S227, and otherwise, the flow advances to S239.

In S239, the system control unit 110 determines whether or not an OK operation has been performed in the electric power source determination screen. In a case of determining that an OK operation has been performed, the flow returns to S202, and otherwise, the flow returns to S238.

(Regarding Lens Selection Processing) FIG. 6A is a flowchart showing details of the lens selection processing in S210 and S225. The processing of each step in this flowchart is realized by the system control unit 110 loading programs stored in the non-volatile memory 129 to the system memory 126 and executing the programs.

In S610, the system control unit 110 displays the lens selection screen illustrated in FIG. 3C.

In S611, the system control unit 110 determines whether or not the type of the lens 125 mounted to the lens mount 101 is identifiable. If the lens 125 and the lens mount 101 are electrically connected, and also type information of the lens 125 (information indicating lens type) can be acquired, for example, the system control unit 110 determines that the type of the lens 125 is identifiable. Conversely, in a case in which the lens 125 is not mounted to the lens mount 101, or in which communication cannot be electrically made with the lens 125, the system control unit 110 determines that the type of the lens 125 is not identifiable. Also, in a case in which the lens 125 is an unknown lens that makes a notification of unforeseen information, the system control unit 110 determines that the type of the lens 125 is not identifiable. In a case in which determination is made that the type of the lens 125 is identifiable, the flow advances to S613, and otherwise, the flow advances to S614.

In S613, the system control unit 110 sets the item 309 for "mounted lens" in the lens selection screen to a selectable state (enables the item 309). Once the item 309 for "mounted lens" is enabled, the text shown in the item 309 is displayed in white.

In S614, the system control unit 110 changes the color of the text in the item 309 for "mounted lens" in the lens selection screen to gray. The system control unit 110 then disables the item 309, so that it is in an unselectable state.

In S615, the system control unit 110 determines whether or not the user has selected the item 307 for "lens for mirrorless camera" or the item 308 for "lens for single-lens reflex camera" from the lens selection screen. In a case of determining that the item 307 or the item 308 has been selected, the flow advances to S619, and otherwise, the flow advances to S616.

In S616, the system control unit 110 determines whether or not the user has selected the item 309 for "mounted lens" (a user operation has been made to select the type of the lens of the currently-mounted lens as the lens type). In a case of determining that the item 309 has been selected, the flow advances to S618, and otherwise, the flow advances to S617.

In S617, the system control unit 110 determines whether or not a cancel operation has been performed by the user. In a case of determining that a cancel operation has been performed, the processing of this flowchart ends, and otherwise, the flow returns to S615.

In S618, the system control unit 110 identifies the lens type of the currently-mounted lens 125, and stores information of the lens type that is identified in the system memory 126 as information of the "selected lens type" (conditions of lens type selected by the user). Accordingly, the user can be said to have selected conditions of lens type that "the type of the lens 125 currently mounted is the type of lens 125 to be used when shooting" in the lens selection processing. The system control unit 110 acquires information of the electric power consumption of the lens 125 (maximum value of electric power consumption) from the lens 125, for example, and matches this information with a correlation table of electric power consumption and lens types provided in the non-volatile memory 129, thereby determining the lens type of the lens 125. Alternatively, the system control unit 110 may determine the type of the lens 125 by acquiring a lens product ID (identification information) from the lens 125, and matching this with a correlation table of lens product IDs and lens types that is stored in the non-volatile memory 129. The lens product ID is, for example, information of a group to which the lens 125 belongs (information of the model of the lens 125 or the like), or information that is unique to the lens 125 (serial No. of the lens 125 or the like). Thus, the lens type of the mounted lens 125 can be identified more precisely. Note that the information that the system control unit 110 receives from the lens 125 may be any information (e.g., manufacturer information or lens size information), as long as it is information by which the lens type can be identified. Also, in the system control unit 110, in a case in which information of electric power consumption can be received from the lens 125, this information of electric power consumption may be stored in the system memory 126 as information of the lens type.

In S619, the system control unit 110 stores the information of the lens type selected in S615 in the system memory 126 as information of the "selected lens type". Accordingly, the user can be said to have selected conditions of lens type that "the type of the lens that the user has selected from the lens for mirrorless camera and the lens for single-lens reflex camera is the type of lens 125 to be used when shooting" in the lens selection processing.

Thus, the user can select the lens type to use for shooting in the lens selection processing. Accordingly, even in cases in which there is a difference in electric power consumption by the digital camera 100 depending on the lens type, usage conditions of other factors can be shown, taking into consideration the lens type to be used for shooting.

Figure 6B:
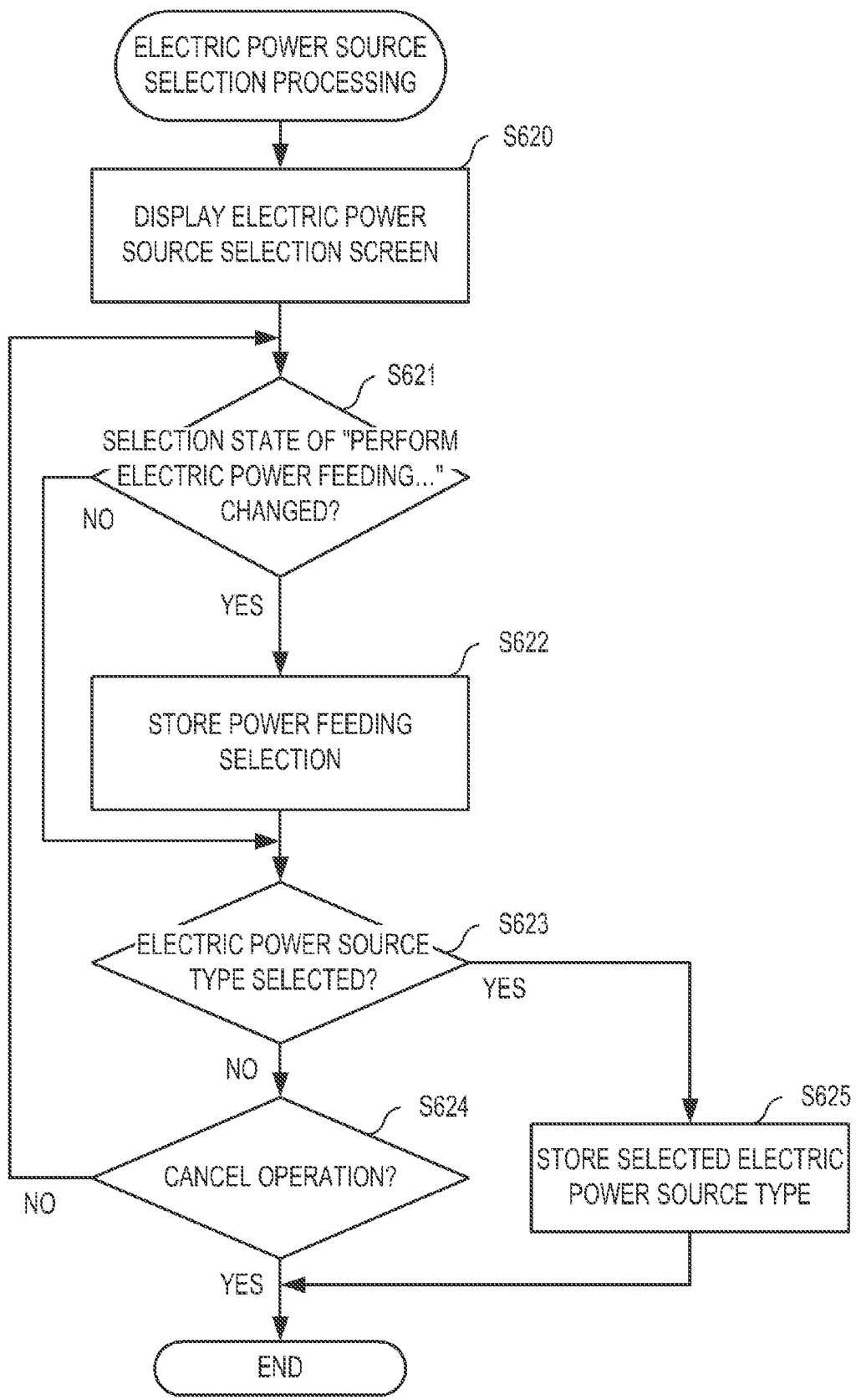
FIG. 6B is a flowchart showing electric power source selection processing.

(Regarding Electric Power Source Selection Processing)
FIG. 6B is a flowchart showing details of the electric power source selection processing in S212. The processing of each step in this flowchart is realized by the system control unit 110 loading programs stored in the non-volatile memory 129 to the system memory 126 and executing the programs.

In S620, the system control unit 110 displays the electric power source selection screen that is illustrated in FIG. 3D. Note that in a case in which a certain item out of the items 311 to 313 (an item indicating a certain electric power source type) is selected, the system control unit 110 may display this item with a different color from the other items, in a case in which usage conditions of other factors (recording settings) are limited. Note that instead of displaying the certain item with a different color from the other items, the system control unit 110 may perform display by another different display form (shape, blinking, or heavy frame).

In S621, the system control unit 110 determines whether or not the selection state of the item 314 for "perform electric power feeding from camera to microphone accessory" has been changed. In a case of determining that the selection state of the item 314 has been changed, the flow advances to S622, and otherwise, the flow advances to S623. Note that when the selection state of the item 314 is changed, the system control unit 110 reflects the change in the selection state of the item 314 in the display of the checkbox in the electric power source selection screen.

In S622, the system control unit 110 stores the information of whether or not to perform microphone electric power feeding that the 314 indicates after the selection state has been changed in the system memory 126 as information of "electric power feed selection" (conditions of whether or not to perform electric power feeding selected by the user). Accordingly, the user can be said to have selected conditions of whether or not to perform microphone electric power feeding of "whether or not to perform microphone electric power feeding indicated by the item 314 following the selection state being changed is whether or not to perform microphone electric power feeding when shooting" in the electric power source selection processing. Note that prior to the selection state of the item 314 being changed, the information according to the selection state prior to changing is stored in the system memory 126 as information of "electric power feed selection". That is to say, by changing the selection state of the item 314, the information of the "electric power feed selection" stored in the system memory 126 is updated.

In S623, the system control unit 110 determines whether or not one item out of the items 311 to 313 (an item indicating one of the electric power source types) has been selected. In a case of determining that one of the items 311 to 313 has been selected, the flow advances to S625, and otherwise, the flow advances to S624.

In S624, the system control unit 110 determines whether or not a cancel operation has been performed by the user. In a case of determining that a cancel operation has been performed, the processing of this flowchart ends, and otherwise, the flow returns to S621.

In S625, the system control unit 110 stores information of the electric power source type indicated by the item selected in S623, as information of "selected electric power source type" (conditions of electric power source type selected by the user) in the system memory 126. Accordingly, the user can be said to have selected conditions of electric power source type that "the electric power source type that the item selected in S623 indicates is the electric power source type to be used when shooting" in the electric power source selection processing.

Accordingly, in S621 in the electric power source selection processing, the user can select conditions for whether or not to perform microphone electric power feeding. Accordingly, usage conditions of other factors can be indicated, taking into consideration electric power that the external microphone 122 needs.

Also, as described above, the display form (color or shape) of an item indicating conditions that cause limitations in usage conditions of other factors besides the electric power source type can be made to differ from the display form of other items (items indicating conditions regarding which limitations do not occur in usage conditions). Thus, the user can comprehend which item will affect determination results of usage conditions when selected, prior to selection of conditions for the electric power source type. Accordingly, the load on the user in a case in which the user desires to comprehend determination results under various conditions (the load of the user repeatedly confirming determination results while changing the conditions that are selected) can be reduced.

(Regarding Driving Selection Processing) FIG. 7A is a flowchart showing details of driving selection processing in S216 and S231. The processing of each step in this flowchart is realized by the system control unit 110 loading programs stored in the non-volatile memory 129 to the system memory 126 and executing the programs.

In S710, the system control unit 110 displays the driving selection screen illustrated in FIG. 4A on the display unit 106.

In S711, the system control unit 110 determines whether or not the item 415 of "use" has been selected. In a case of determining that the item 415 has been selected, the flow advances to S714, and otherwise, the flow advances to S712.

In S712, the system control unit 110 determines whether or not the item 416 of "do not use" has been selected. In a case of determining that the item 416 has been selected, the flow advances to S714, and otherwise, the flow advances to S713.

In S713, the system control unit 110 determines whether or not a cancel operation has been performed by the user. In a case of determining that a cancel operation has been performed by the user, the processing of this flowchart ends, and otherwise, the flow returns to S711.

In S714, the system control unit 110 stores information of whether or not to perform double-speed driving indicated by the item that is selected as information of "double-speed driving conditions" (conditions of whether or not to perform double-speed driving selected by the user) in the system memory 126. Accordingly, the user can be said to have selected conditions of whether or not to perform double-speed driving that "whether or not to perform double-speed driving indicated by the item 415 or the item 416 that is selected is whether or not to perform double-speed driving when shooting" in the driving selection processing.

(Regarding Settings Selection Processing) FIG. 7B is a flowchart showing details of settings selection processing in S227. The processing of each step in this flowchart is realized by the system control unit 110 loading programs stored in the non-volatile memory 129 to the system memory 126 and executing the programs.

In S720, the system control unit 110 displays the settings selection screen that is illustrated in FIG. 4B on the display unit 106. Note that in a case in which there is an item in the items of the item group 417 regarding which selection thereof will limit usage conditions of other factors, the system control unit 110 may display this item with a different color or shape from the other items (items regarding which selection thereof will not limit usage conditions of other factors).

In S721, the system control unit 110 determines whether or not the selection state of one of the items of the plurality of recording settings indicated by the item group 417 has been changed. In a case of determining that the selection state of one of the plurality of recording settings has been changed, the flow advances to S722, and otherwise, advances to S723. Note that upon the selection state of one of the plurality of recording settings being changed, the system control unit 110 updates the display of the checkbox in the item group 417 in accordance with the changed selection state.

In S722, the system control unit 110 stores information of the currently-selected recording settings as information of "selected recording settings" (conditions of recording settings selected by the user) in the system memory 126. Accordingly, the user can be said to have selected conditions of recording settings that "the recording settings currently selected in the item group 417 are the recording settings when shooting" in the settings selection processing. Note that prior to the selection state of one of the items for the plurality of recording settings being changed, the information according to the selection state prior to changing is stored in the system memory 126 as information of "selected recording settings". That is to say, by changing the selection state of one item of the plurality of recording settings, the information of the "selected recording settings" stored in the system memory 126 is updated.

In S723, the system control unit 110 determines whether or not an OK operation has been performed by the user. In a case of determining that an OK operation has been performed, the processing of this flowchart ends, and otherwise, the flow advances to S724.

In S724, the system control unit 110 determines whether or not a cancel operation has been performed by the user. In a case of determining that a cancel operation has been performed, the processing of this flowchart ends, and otherwise, the flow returns to S721.

Thus, according to the conditions display processing, upon the user selecting desired conditions regarding a certain factor, the user can be notified of (made to comprehend) conditions of other factors, such that the digital camera 100 can be used without the maximum electric power consumption exceeding the suppliable electric power.

In particular, in a case in which a shot image (shooting conditions) that the user wants to acquire is decided in advance, once the user selects conditions such as the sensor mode, recording format, framerate, and so forth, conditions of an electric power source configuration necessary to perform shooting under those conditions can be presented. Conversely, in a case in which the electric power source configuration to use for shooting is decided in advance, once the user selects the conditions for that electric power source configuration, conditions of the sensor mode, recording format, and framerate, which are usable for shooting, can be presented. Thus, conditions under which the digital camera 100 is usable can be communicated to the user in various usage cases, contributing to the user being able to smoothly perform settings and prepare accessory devices. That is to say, usability of the digital camera 100 is kept from being reduced.

Also, in S721, the user can place a plurality of items for recording settings in a selected state at the same time (can select a plurality of items for recording settings). In S234 and S237, the system control unit 110 displays conditions for electric power source configurations usable under all of the plurality of conditions for recording settings selected. Accordingly, conditions for electric power source configurations usable under all of the conditions for recording settings that the user desires can be presented, whereby the user can use the digital camera 100 while switching the plurality of recording settings during a series of shooting.

Figure 9:
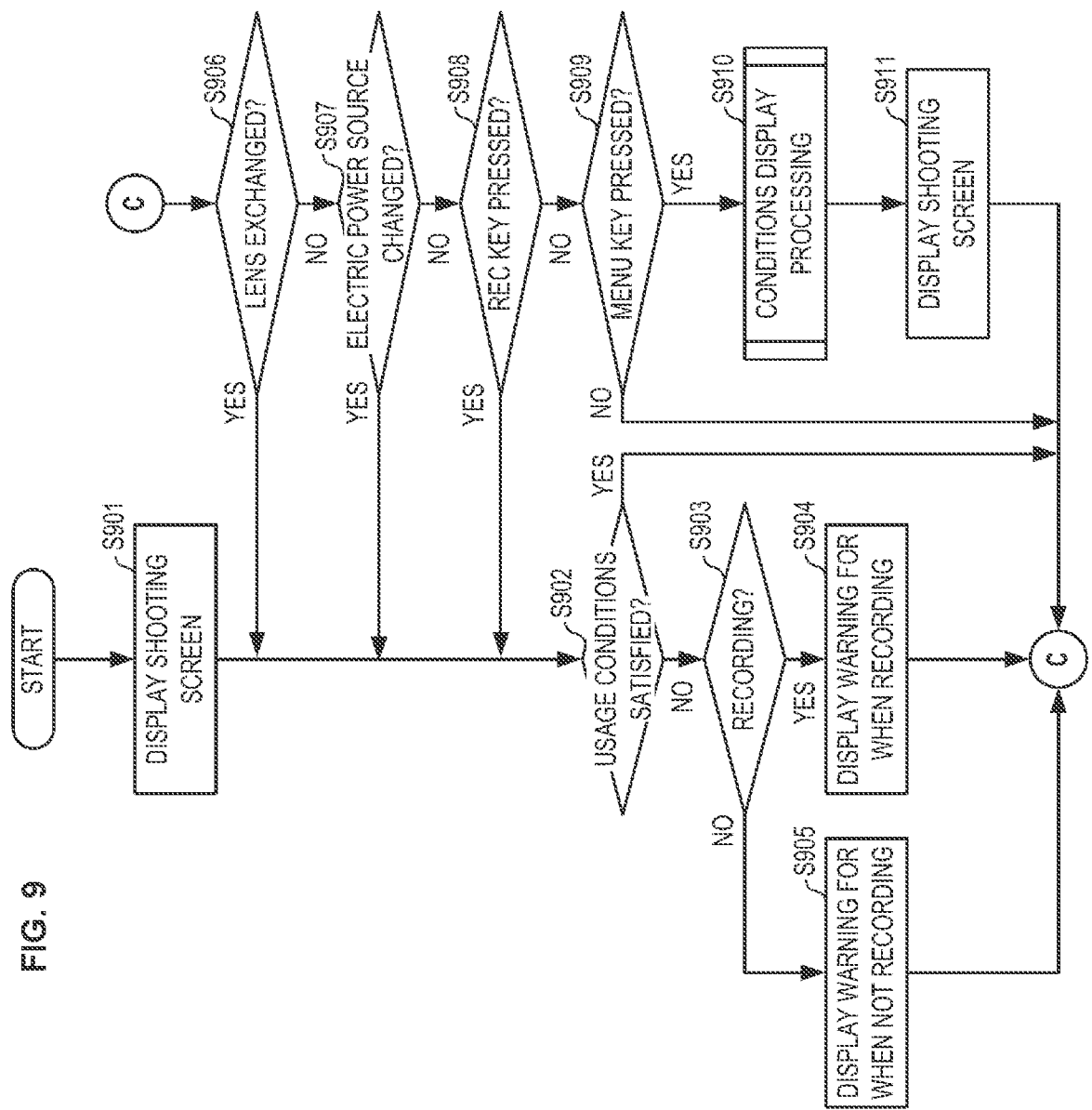
FIG. 9 is a flowchart showing processing when shooting.

(Processing when Shooting) FIG. 9 is a flowchart showing processing when shooting with the digital camera 100. The processing of each step in this flowchart is realized by the system control unit 110 loading programs stored in the non-volatile memory 129 to the system memory 126 and executing the programs. Also, FIGS. 10A to 10C illustrate screens displayed on the display unit 106 in the flowchart shown in FIG. 9.

The processing of this flowchart is started when the electric power source of the digital camera 100 is turned to an on state in accordance with user operations of the mode switch 111.

Figure 10A:
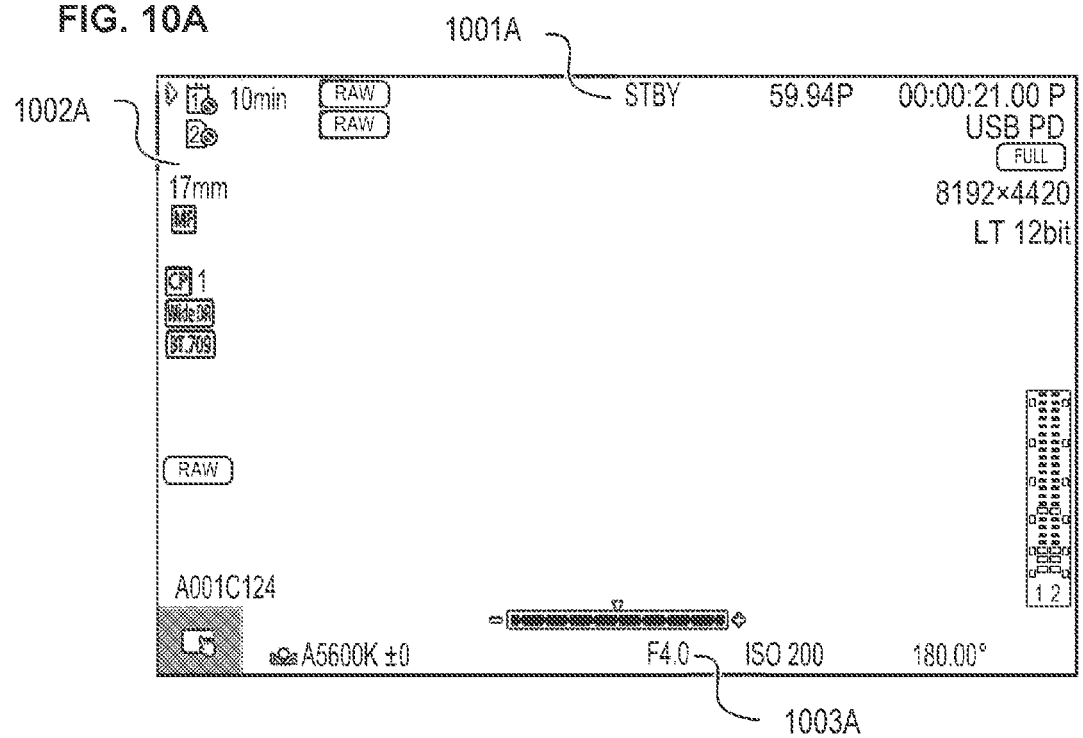
Figure 10B:
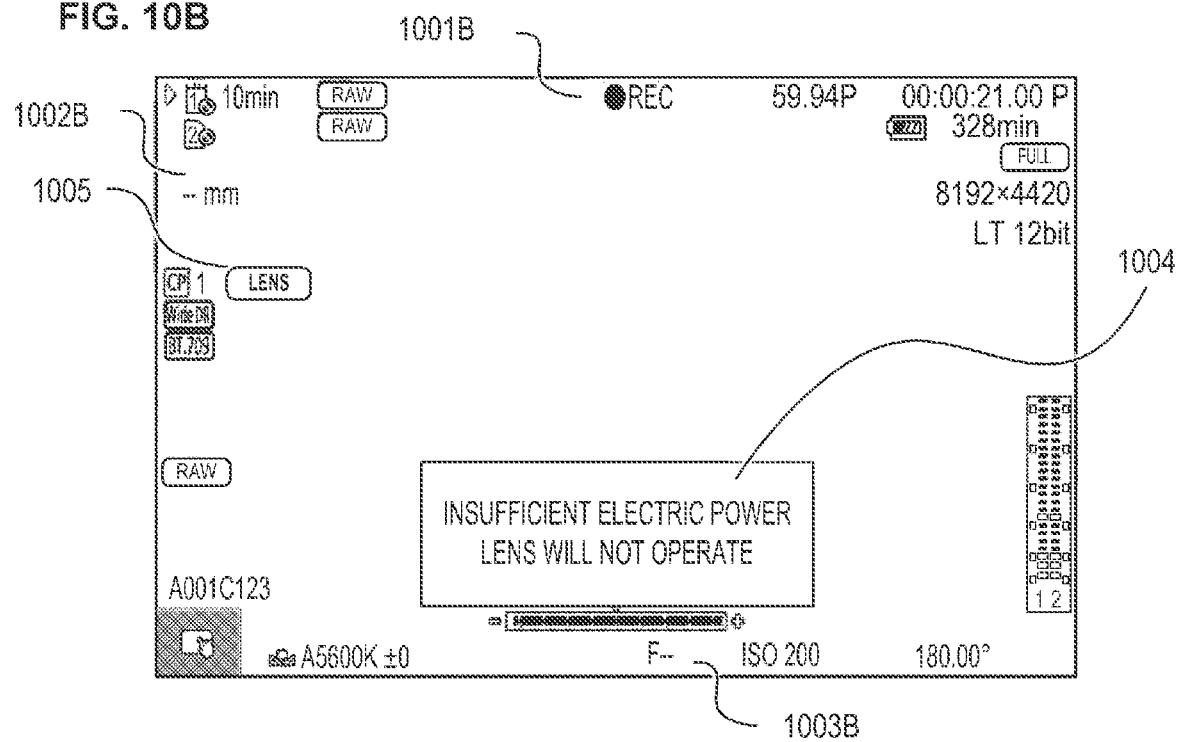

In S901, the system control unit 110 displays a shooting screen in FIG. 10A on the display unit 106. A display item 1001A is a display item indicating a recording operation state, indicating recording standby. A display item 1002A indicates the current focal length of the lens 125 that is mounted. A display item 1003A indicates the current f-number of the lens 125 that is mounted.

In S902, on the basis of the current state (settings state) of the digital camera 100, the system control unit 110 references the determination table shown in FIG. 8 and determines whether or not usage conditions of the digital camera 100 are satisfied. Note that the current state of the digital camera 100 is the current settings state of a plurality of factors (recording settings, whether or not to perform double-speed driving, electric power source type for performing electric power feeding, type of the lens 125, and whether or not to perform microphone electric power feeding) in the digital camera 100. A case in which usage conditions are satisfied is a case in which the current state (settings state) of the digital camera 100 satisfies conditions that the maximum electric power consumption when shooting is not more than the suppliable electric power without operations of the digital camera 100 being limited. A case in which usage conditions are not satisfied is a case in which the current state (settings state) of the digital camera 100 does not satisfy conditions that the maximum electric power consumption when shooting is not more than the suppliable electric power without operations of the digital camera 100 being limited. For example, a case will be assumed in which a lens for a single-lens reflex camera is set as the lens 125 of the digital camera 100. In this case, if supply of electric power to the lens 125 is stopped in the digital camera 100 while shooting, operations of the digital camera 100 (specifically, driving of the lens 125) are limited, and accordingly the system control unit 110 makes determination that usage conditions are not satisfied. In a case of determining that usage conditions of the digital camera 100 are satisfied, the flow advances to S906, and otherwise, the flow advances to S903.

In S903, the system control unit 110 determines whether or not the digital camera 100 is currently recording moving images (shooting). In a case in which determination is made that the digital camera 100 is currently recording moving images, the flow advances to S904, and otherwise, the flow advances to S905.

In S904, the system control unit 110 displays a warning screen for when recording moving images (for when shooting) illustrated in FIG. 10B on the display unit 106. Note that at the point in time of starting the processing of S904, there is not enough electric power to drive the lens 125, and accordingly supply of electric power from the digital camera 100 to the lens 125 is stopped.

In the warning screen illustrated in FIG. 10B, a display item 1001B is a display item that indicates the recording operation state, indicating that the digital camera 100 is currently recording moving images (shooting). A display item 1002B is a display item that indicates the current focal length of the lens 125 that is mounted, but supply of electric power to the lens 125 is stopped due to insufficient electric power, and accordingly indicates a disabled state. A display item 1003B is a display item that indicates the current f-number of the lens 125 that is mounted, but supply of electric power to the lens 125 is stopped due to insufficient electric power, and accordingly indicates a disabled state.

A warning item 1004 shows a brief text that does not take much display area, taking into consideration that a moving image is being recorded. Specifically, the warning item 1004 indicates that electric power is insufficient, and that the lens 125 will not operate. A warning item 1005 indicates that the lens 125 will not operate. Note that in S904, the user is not prompted to reference the electric power source navigation screen (FIG. 3B).

In S905, the system control unit 110 displays a warning screen for when not recording moving images (for when not shooting) illustrated in FIG. 10C. A warning item 1006 shows the reason why the lens 125 will not operate, and thereupon prompts the user to reference the electric power source navigation screen (FIG. 3B). This is because the user is assumed to have time to confirm the state of the digital camera 100, since the digital camera 100 is not recording moving images.

In S906, the system control unit 110 determines whether or not the lens 125 has been exchanged. In a case of determining that the lens 125 has been exchanged, the flow returns to S902, and otherwise, the flow advances to S907.

In S907, the system control unit 110 controls the electric power source control unit 117 and determines whether or not the electric power source that supplies electric power has been changed. In a case of determining that the electric power source that supplies electric power has been changed, the flow returns to S902, and otherwise, the flow advances to S908.

In S908, the system control unit 110 determines whether or not the state of recording moving images (whether shooting or not) has been changed by the REC key 116 being pressed. In a case of determining that the state of recording moving images has been changed, the flow returns to S902, and otherwise, the flow advances to S909.

In S909, the system control unit 110 determines whether or not the menu key 112 has been pressed. In a case of determining that the menu key 112 has been pressed, the flow advances to S910, and otherwise, the flow returns to S906.

In S910, the system control unit 110 performs conditions display processing following the flowchart shown in FIG. 2.

That is to say, the menu screen illustrated in FIG. 3A is displayed on the display unit 106 in S910 by the menu key 112 being pressed.

In S911, the system control unit 110 displays the shooting screen illustrated in FIG. 10A on the display unit 106, in the same way as in step S901.

Thus, according to the flowchart in FIG. 9, in a case in which a state of insufficient electric power is occurring (limitation of operations is occurring due to insufficient electric power), or there is a possibility that a state of insufficient electric power will occur, this state can be communicated to the user by the warning items. Also, unless currently recording moving images, the digital camera 100 prompts the user to reference the electric power source navigation screen, by the warning items. Thus, the user can accurately understand the state of insufficient electric power, and can smoothly avert operation limitations due to insufficient electric power. In a case of currently recording moving images, the digital camera 100 performs notification that electric power is insufficient and that the lens 125 will not operate, by a brief expression, and separately prompts the user to reference the electric power source navigation screen after the moving image recording ends.

Note that in a case in which usage conditions are not satisfied, the system control unit 110 may notify the user that usage conditions are not satisfied by audio, and is not limited to displaying the warning items. In this case as well, the system control unit 110 also prompts the user to reference the electric power source navigation screen by audio, unless currently recording moving images (shooting), for example.

In the above, the digital camera 100 determines usage conditions such that the maximum electric power consumption is not more than the suppliable electric power when shooting. However, this is not limited to when shooting, and usage conditions may be determined in predetermined situations, such as during playback of images (playing moving images), when executing predetermined image processing, or when performing predetermined shooting (e.g., when performing flash shooting) or the like.

Also, there is no need for the digital camera 100 to perform all of the processing in the above flowcharts. For example, while the digital camera 100 is an electronic device that performs shooting in accordance with a plurality of factors, a display control device may be provided that determines the usage conditions of the digital camera 100 and causes the digital camera 100 to display the determined usage conditions. That is to say, a display control device that has part of the configuration of the digital camera 100 described above may be provided.

Note that the above-described various types of control, described as being performed by the system control unit 110, may be processing that is carried out by one piece of hardware, or that is shared among a plurality of pieces of hardware (e.g., a plurality of processors or circuits), thereby carrying out the control of the entire device.

Also, while the present disclosure has described in detail a preferred embodiment, some embodiments are not limited to these particular embodiments, and various forms made without departing from the spirit and scope of this disclosure are also encompassed by some embodiments. Further, each of the above-described embodiments is only an embodiment of the present disclosure, and the embodiments may be combined as appropriate.

Also, although an example of applying the present disclosure to a digital camera has been described in the above-described embodiment, some embodiments are not limited to this example, and some may be applicable to any electronic devices to which a plurality of types of electric power sources can be connected. That is to say, the present disclosure is applicable to personal computers (PCs), personal digital assistants (PDAs), mobile telephone terminals, portable image views, printer devices having displays, digital photo frames, music players, gaming devices, electronic book readers, and so forth.

Also, some embodiments are not limited to an image-capturing device main unit, and some embodiments are applicable to a control device that communicates with an image-capturing device (including a network camera) via wired or wireless communication, and remotely controls the image-capturing device. Examples of devices that remotely control the image-capturing device include devices such as smartphones, table PCs, desktop PCs, and so forth. The image-capturing device is remotely controllable from the control device side by notification of commands causing the image-capturing device to perform various types of operations and settings, on the basis of operations performed at the control device side and processing performed at the control device side. Also, an arrangement may be made in which live view images shot at the image-capturing device are received via wired or wireless communication, and displayed at the control device side.

According to the preset disclosure, the user can be caused to comprehend usage conditions of the electronic device, so that usability is not reduced.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-203246, which was filed on Dec. 15, 2021 and which is hereby incorporated by reference herein in its entirety.

What is claimed is:

1. A display control device related to an electronic device, wherein
suppliable electric power of the electronic device is electric power suppliable from an electric power source to the electronic device, the suppliable electric power being determined on a basis of a type of electric power source,
maximum electric power consumption of the electronic device is determined on a basis of at least a plurality of factors including the type of electric power source, and
the display control device comprises at least one memory and at least one processor which are configured to:
acquire conditions of a first factor that is at least one factor out of the plurality of factors, the conditions corresponding to a selection performed by a user;
determine conditions of a second factor out of the plurality of factors that is different from the first factor on a basis of conditions of the first factor, the conditions being conditions under which the maximum electric power consumption is not more than the suppliable electric power without operation of the electronic device being limited in a predetermined situation; and
control a display unit to display conditions of the second factor.

2. The display control device according to claim 1, wherein
a lens is detachably mountable to the electronic device, and
the plurality of factors include a lens type that is a type of the lens mounted to the electronic device in the predetermined situation.

3. The display control device according to claim 2, wherein
the at least one memory and the at least one processor are further configured to
acquire information of the lens mounted to the electronic device, and
in a case in which a user operation is performed to select the type of the lens currently mounted to the electronic device as the lens type, acquire conditions of the lens type on a basis of the information of the lens, as the conditions of the first factor.

4. The display control device according to claim 3, wherein
the information of the lens is information of a group to which the lens mounted to the electronic device belongs.

5. The display control device according to claim 3, wherein
the information of the lens is information of electric power consumption of the lens mounted to the electronic device.

6. The display control device according to claim 1, wherein the at least one memory and the at least one processor are further configured to:
control the display unit to display an item indicating the conditions of the first factor selectable by the user.

7. The display control device according to claim 6, wherein the at least one memory and the at least one processor are further configured to:
control a display form of a first item to a display form that is different from a display form of a second item,
wherein the first item indicates at least one of the conditions of the first factor selectable by the user, wherein if the conditions indicated by the first item are selected by the user, the conditions of the second factor are limited, and
wherein the second item indicates at least one of the conditions of the first factor selectable by the user, wherein even if the conditions indicated by the second item are selected by the user, the conditions of the second factor are not limited.

8. The display control device according to claim 7, wherein the at least one memory and the at least one processor are further configured to:
in a case in which the user selects a plurality of conditions of the first factor, determine the conditions of the second factor under which the maximum electric power consumption is not more than the suppliable electric power without operation of the electronic device being limited in the predetermined situation, for all of the plurality of conditions.

9. The display control device according to claim 1, wherein the second factor is a plurality of factors, and
wherein the at least one memory and the at least one processor are further configured to control the display unit to display a combination of the conditions of the plurality of factors that are the second factors in a table format.

10. The display control device according to claim 1, wherein the plurality of factors include a third factor that is different from both the first factor and the second factor, and
wherein the at least one memory and the at least one processor are further configured to, in a case in which the conditions of the second factor change in accordance with the third factor, (1) acquire conditions of the third factor in accordance with a selection performed by the user, and (2) determine the conditions of the second factor on a basis of conditions of the first factor and conditions of the third factor.

11. The display control device according to claim 10, wherein
the at least one memory and the at least one processor are further configured to, in a case in which the conditions of the second factor do not change in accordance with the third factor, (1) not acquire conditions of the third factor in accordance with a selection performed by the user, and (2) determine the conditions of the second factor regardless of the third factor.

12. The display control device according to claim 1, wherein the at least one memory and the at least one processor are further configured to:
determine whether or not a current settings state of the plurality of factors in the electronic device satisfies usage conditions that are conditions under which the maximum electric power consumption is not more than the suppliable electric power without operation of the electronic device being limited in the predetermined situation, and
control the display unit to (1) prompt the user to reference a predetermined screen for displaying conditions of the second factor in a case of determining that the usage conditions are not satisfied, and to (2) display the predetermined screen in accordance with user operations being performed to display the predetermined screen.

13. The display control device according to claim 12,
wherein the predetermined situation is during shooting by the electronic device, and
wherein the at least one memory and the at least one processor are further configured to not prompt the user to reference the predetermined screen during shooting by the electronic device even in a case in which it is determined that the usage conditions are not satisfied.

14. The display control device according to claim 1, wherein
the plurality of factors include whether or not to perform electric power supply from the electronic device to predetermined peripheral equipment in the predetermined situation.

15. The display control device according to claim 1, wherein
the electronic device includes an image-capturing sensor, and
in a case of the at least one memory and the at least one processor acquiring, as the conditions of the first factor, at least conditions of an effective region of the image-capturing sensor, a recording format of image data acquired by capturing images, and a framerate of the image data, in the predetermined situation,
the at least one memory and the at least one processor are further configured to determine conditions of the type of the electric power source, as the conditions of the second factor.

16. The display control device according to claim 1, wherein the at least one memory and the at least one processor are further configured to:
determine, along with conditions of the type of the electric power source, conditions of whether or not to perform electric power supply to predetermined peripheral equipment, as the conditions of the second factor.

17. The display control device according to claim 1, wherein
the electronic device includes an image-capturing sensor, and
in a case of the at least one memory and the at least one processor acquiring, as the conditions of the first factor, at least conditions of the type of the electric power source in the predetermined situation,
the at least one memory and the at least one processor are further configured to determine conditions of an effective region of the image-capturing sensor, a recording format of image data acquired by capturing images, and a framerate of the image data, as the conditions of the second factor.

18. A display control method related to an electronic device, wherein
suppliable electric power of the electronic device is electric power suppliable from an electric power source to the electronic device, the suppliable electric power being determined on a basis of a type of electric power source, and
maximum electric power consumption of the electronic device is determined on a basis of at least a plurality of factors including the type of electric power source,
the display control method comprising:
acquiring conditions of a first factor that is at least one factor out of the plurality of factors, the conditions corresponding to a selection performed by a user;
determining conditions of a second factor out of the plurality of factors that is different from the first factor on a basis of conditions of the first factor acquired in the acquiring, the conditions being conditions under which the maximum electric power consumption is not more than the suppliable electric power without operation of the electronic device being limited in a predetermined situation; and
controlling a display unit to display conditions of the second factor determined in the determining.

19. A non-transitory computer readable medium that stores computer-executable instructions, wherein the computer-executable instructions, when executed, cause a computer to execute a display control method related to an electronic device, wherein
suppliable electric power of the electronic device is electric power suppliable from an electric power source to the electronic device, the suppliable electric power being determined on a basis of a type of electric power source,
maximum electric power consumption of the electronic device is determined on a basis of at least a plurality of factors including the type of electric power source, and
the display control method comprises:
acquiring conditions of a first factor that is at least one factor out of the plurality of factors, the conditions corresponding to a selection performed by a user,
determining conditions of a second factor out of the plurality of factors that is different from the first factor on a basis of conditions of the first factor acquired in the acquiring, the conditions being conditions under which the maximum electric power consumption is not more than the suppliable electric power without operation of the electronic device being limited in a predetermined situation, and
controlling a display unit to display conditions of the second factor determined in the determining.

* * * * *